(12) United States Patent
Wroczynski et al.

(10) Patent No.: US 11,151,318 B2
(45) Date of Patent: *Oct. 19, 2021

(54) SYSTEM AND METHOD FOR DETECTING UNDESIRABLE AND POTENTIALLY HARMFUL ONLINE BEHAVIOR

(71) Applicant: Samurai Labs sp. z o.o., Sopot (PL)

(72) Inventors: Michal Wroczynski, Sopot (PL); Gniewosz Leliwa, Gdansk (PL)

(73) Assignee: SAMURAI LABS sp. z. o.o.

( * ) Notice: Subject to any disclaimer, the term of this patent is extended or adjusted under 35 U.S.C. 154(b) by 0 days.

This patent is subject to a terminal disclaimer.

(21) Appl. No.: 17/191,429

(22) Filed: Mar. 3, 2021

(65) Prior Publication Data

US 2021/0248316 A1 Aug. 12, 2021

Related U.S. Application Data

(63) Continuation of application No. 16/289,881, filed on Mar. 1, 2019, now Pat. No. 10,956,670.

(Continued)

(51) Int. Cl.
*G06F 40/253* (2020.01)
*G06N 3/08* (2006.01)
(Continued)

(52) U.S. Cl.
CPC .......... *G06F 40/253* (2020.01); *G06F 40/211* (2020.01); *G06F 40/216* (2020.01);
(Continued)

(58) Field of Classification Search
USPC .............................................. 704/7–10, 257
See application file for complete search history.

(56) References Cited

U.S. PATENT DOCUMENTS

| 5,794,050 A | 8/1998 | Dahlgren |
|---|---|---|
| 5,864,788 A | 1/1999 | Katsumi |

(Continued)

FOREIGN PATENT DOCUMENTS

| CA | 2009042 | 8/1990 |
|---|---|---|
| CA | 1301345 | 5/1992 |

(Continued)

OTHER PUBLICATIONS

Bunt H., Merlo P., Nivre J. (2010). Trends in Parsing Technology. Chapters 1.1, 1.2 (introduction), 1.2.1, 1.2.2, 1.2.3. Springer.

(Continued)

*Primary Examiner* — Leonard Saint Cyr
(74) *Attorney, Agent, or Firm* — Martensen IP; Barbara B. Courtney

(57) ABSTRACT

Embodiments include computer-implemented methods and systems for detecting undesirable and potentially harmful online behavior. The embodiments described and claimed could also be applied to detecting any other type of online behavior to be detected, but the descriptions focuses on detecting online violence. More particularly, the embodiments disclosed relate to detecting online violence using symbolic methods of natural language processing (NLP) that utilize and govern the usage of: 1) syntactic parser for analyzing grammatical context of the input text data, 2) unsupervised learning methods for improving selected aspects of the system and adjusting the system to new data sources and guidelines, and 3) statistical classifiers for resolving specific well-defined sub-tasks, in which statistical approaches surpass the symbolic methods.

30 Claims, 19 Drawing Sheets

Related U.S. Application Data

(60) Provisional application No. 62/638,073, filed on Mar. 3, 2018.

(51) Int. Cl.
*H04L 12/58* (2006.01)
*G06N 20/00* (2019.01)
*G06F 40/211* (2020.01)
*G06F 40/216* (2020.01)
*G06F 40/279* (2020.01)

(52) U.S. Cl.
CPC .......... *G06F 40/279* (2020.01); *G06N 3/088* (2013.01); *G06N 20/00* (2019.01); *H04L 51/046* (2013.01)

(56) References Cited

U.S. PATENT DOCUMENTS

| | | |
|---|---|---|
| 6,076,088 A | 6/2000 | Paik |
| 6,112,168 A | 8/2000 | Corston |
| 6,721,697 B1 | 4/2004 | Duan |
| 6,952,666 B1 | 10/2005 | Weise |
| 6,961,728 B2 | 11/2005 | Wynblatt |
| 7,010,479 B2 | 3/2006 | Murata |
| 7,024,350 B2 | 4/2006 | Schmid |
| 7,444,403 B1 | 10/2008 | Packer |
| 7,475,010 B2 | 12/2009 | Chao |
| 7,689,410 B2 | 3/2010 | Chang |
| 8,180,758 B1 | 5/2012 | Cornali |
| 8,527,262 B2 | 9/2013 | Kambhatla |
| 8,554,835 B1 | 10/2013 | Williams |
| 8,583,422 B2 | 11/2013 | Todhunter |
| 8,600,728 B2 | 12/2013 | Knight |
| 8,600,734 B2 | 12/2013 | Warner |
| 8,600,736 B2 | 12/2013 | Ball |
| 8,612,232 B2 | 12/2013 | Bangalore |
| 8,639,493 B2 | 1/2014 | Haug |
| 8,639,495 B2 | 1/2014 | Eggebraaten |
| 8,645,124 B2 | 2/2014 | Zangvil |
| 8,671,341 B1 | 3/2014 | Hellwig |
| 8,706,491 B2 | 4/2014 | Chelba |
| 8,977,953 B1 | 3/2015 | Pierre |
| 9,245,115 B1 | 1/2016 | Jakobsson |
| 9,967,218 B2 * | 5/2018 | Chu ................. H04L 51/12 |
| 10,148,600 B1 | 12/2018 | White |
| 10,225,227 B2 | 3/2019 | Balasubramanian |
| 10,389,607 B1 | 8/2019 | Borovikov |
| 10,419,375 B1 | 9/2019 | Sokolov |
| 2001/0021909 A1 | 9/2001 | Shimomura |
| 2002/0143755 A1 | 10/2002 | Wynblatt |
| 2003/0074188 A1 | 4/2003 | Murata |
| 2003/0182102 A1 | 9/2003 | Corston-Oliver |
| 2003/0233225 A1 | 12/2003 | Bond |
| 2004/0030679 A1 | 2/2004 | Gonnet |
| 2004/0221235 A1 | 11/2004 | Marchisio |
| 2005/0060139 A1 | 3/2005 | Corston-Oliver |
| 2005/0154709 A1 | 7/2005 | Barsness |
| 2005/0256700 A1 | 11/2005 | Moldovan |
| 2005/0267871 A1 | 12/2005 | Marchisio |
| 2006/0053000 A1 | 3/2006 | Moldovan |
| 2006/0259459 A1 | 11/2006 | Wu |
| 2007/0033004 A1 | 2/2007 | Bangalore |
| 2007/0078812 A1 | 4/2007 | Waingold |
| 2007/0156669 A1 | 7/2007 | Marchisio |
| 2007/0179776 A1 | 8/2007 | Segond |
| 2007/0260450 A1 | 11/2007 | Sun |
| 2008/0059198 A1 | 3/2008 | Maislos |
| 2008/0133570 A1 | 6/2008 | Allen |
| 2008/0275694 A1 | 11/2008 | Varone |
| 2009/0089417 A1 * | 4/2009 | Giffin ................. H04L 51/063 709/224 |
| 2009/0132503 A1 | 5/2009 | Sun |
| 2009/0182756 A1 | 7/2009 | Kang |
| 2009/0292700 A1 | 11/2009 | Castellani |
| 2010/0030553 A1 | 2/2010 | Ball |
| 2010/0063796 A1 | 3/2010 | Rehberg |
| 2010/0082331 A1 | 4/2010 | Brun |
| 2010/0119053 A1 | 5/2010 | Goeldi |
| 2010/0121707 A1 | 5/2010 | Goeldi |
| 2010/0121849 A1 | 5/2010 | Goeldi |
| 2010/0138543 A1 | 6/2010 | Loman |
| 2010/0318558 A1 | 12/2010 | Boothroyd |
| 2010/0332217 A1 | 12/2010 | Wintner |
| 2011/0087485 A1 | 4/2011 | Maude |
| 2011/0106843 A1 | 5/2011 | Pan |
| 2011/0125773 A1 | 5/2011 | Jin |
| 2011/0184982 A1 | 7/2011 | Adamousky |
| 2011/0307434 A1 | 12/2011 | Rostampour |
| 2012/0158852 A1 | 6/2012 | Goldsmith |
| 2012/0240062 A1 | 9/2012 | Passmore |
| 2012/0253793 A1 | 10/2012 | Ghannam |
| 2012/0254738 A1 | 10/2012 | Kuroda |
| 2013/0138428 A1 * | 5/2013 | Chandramouli ........ G06F 40/40 704/9 |
| 2013/0151236 A1 | 6/2013 | Iofinov |
| 2014/0046876 A1 | 2/2014 | Zhang |
| 2014/0163962 A1 | 6/2014 | Castelli |
| 2014/0279050 A1 | 9/2014 | Makar |
| 2014/0280584 A1 | 9/2014 | Ervine |
| 2015/0172145 A1 | 6/2015 | Skiba |
| 2015/0180746 A1 | 6/2015 | Day, II |
| 2015/0256675 A1 | 9/2015 | Sri |
| 2015/0365366 A1 | 12/2015 | Prabhu |
| 2016/0092522 A1 | 3/2016 | Harden |
| 2016/0094492 A1 | 3/2016 | Li |
| 2016/0094507 A1 | 3/2016 | Li |
| 2016/0224537 A1 | 8/2016 | Starostin |
| 2016/0224541 A1 | 8/2016 | Yakovlev |
| 2016/0224542 A1 | 8/2016 | Bulgakov |
| 2016/0261533 A1 | 9/2016 | Cecchi |
| 2017/0093777 A1 | 3/2017 | Neustifter |
| 2017/0149795 A1 | 5/2017 | Day, II |
| 2017/0180499 A1 | 6/2017 | Gelfenbeyn |
| 2017/0344889 A1 | 11/2017 | Sengupta |
| 2017/0353404 A1 | 12/2017 | Hodge |
| 2018/0025726 A1 | 1/2018 | Gatti de Bayser |
| 2018/0032907 A1 * | 2/2018 | Mehdad ............ G06F 16/24578 |
| 2018/0075014 A1 | 3/2018 | Duan |
| 2018/0077088 A1 | 3/2018 | Cabrera-Cordon |
| 2018/0084013 A1 | 3/2018 | Dalton |
| 2018/0131645 A1 | 5/2018 | Magliozzi |
| 2018/0139158 A1 | 5/2018 | Eagleton |
| 2018/0165582 A1 | 6/2018 | Cha |
| 2019/0026601 A1 | 1/2019 | Packalen |
| 2019/0052584 A1 | 2/2019 | Barve |
| 2019/0089656 A1 | 3/2019 | Johnson, Jr. |
| 2019/0124109 A1 | 4/2019 | Foster |
| 2019/0140986 A1 | 5/2019 | Anderson |
| 2019/0166070 A1 | 5/2019 | Dey |
| 2019/0188590 A1 | 6/2019 | Wu |
| 2019/0215282 A1 | 7/2019 | Briggs |
| 2019/0220513 A1 | 7/2019 | Xin |
| 2019/0230170 A1 | 7/2019 | Marlin |
| 2019/0273707 A1 | 9/2019 | Deac |
| 2019/0297033 A1 | 9/2019 | Harma |
| 2020/0028803 A1 | 1/2020 | Helmy |
| 2020/0051189 A1 | 2/2020 | Williams |
| 2020/0065391 A1 | 2/2020 | Dewan |
| 2020/0067861 A1 | 2/2020 | Leddy |
| 2020/0137001 A1 | 4/2020 | Wu |
| 2020/0137014 A1 | 4/2020 | Kasireddy |
| 2020/0143288 A1 | 5/2020 | Eisenzopf |
| 2021/0028606 A1 | 1/2021 | Araki et al. |

FOREIGN PATENT DOCUMENTS

| | | |
|---|---|---|
| EP | 0467527 A2 | 1/1992 |
| EP | 1032861 B1 | 4/2009 |
| WO | 1998000833 A1 | 1/1998 |
| WO | 1999017223 A1 | 4/1999 |
| WO | 2000030070 A1 | 5/2000 |
| WO | 2001011492 A1 | 2/2001 |
| WO | 2002035376 A3 | 8/2003 |

(56) References Cited

FOREIGN PATENT DOCUMENTS

| WO | 2008059111 A2 | 5/2008 |
|---|---|---|
| WO | 2009087431 A1 | 7/2009 |
| WO | 2017162919 A1 | 3/2016 |

OTHER PUBLICATIONS

Charniak E. (1997), Statistical Parsing with a Context-Free Grammar and Word Statistics. Paragraphs „introduction","the algorithm". In AAAI/IAAI, p. 598-603.
De Marneffe M., Manning Ch. D. (2008) The Stanford typed dependencies representation. Proceedings of the workshop on Cross-Framework and Cross-Domain Parser Evaluation. Paragraphs 1, 2.1. Association for Computational Linguistics.
De Marneffe M., MacCartney B., Manning Ch. D. (2006) Generating typed dependency parses from phrase structure parses. Paragraphs 1, 3. In LREC 2006.
Manning Ch.D. (2011). Part-of-Speech Tagging from 97% to 100%: Is It Time for Some Linguistics? Paragraphs 1, 2 (introduction). In CICLing.
Marquez L., Padro L., Rodriguez M. (2000). A Machine Learning Approach to POS Tagging. Paragraph 1.1. Kluwer Academic Publishers.
Palmer M., Gildea D., Xue E. (2010). Semantic Role Labelling. Synthesis Lectures on Human Language Technologies. Chapters 1.1, 1.2, 3 (introduction), 3.1, 5. Morgan & Claypool Publishers.
Tjong Kim Sang E. F., Déjean H. (2001). Introduction to the CoNLL-2001 Shared Task: Clause Identification. Proceedings of CoNLL-2001. Paragraphs 1, 2, 4, 6.
Kanaan, Ghassan, Al-Shalabi R., Sawalha M. (2003) Full Automatic Arabic Text Tagging System, Yarmouk University. The International Conference on Information Technology and Natural Sciences, Amman/Jordan. pp. 1-10.
Patent Cooperation Treaty Application No. PCT/US2013/068360. International Search Report & Written Opinion, dated Jun. 6, 2014. Applicant FIDO LABS INC.
Ciano et al, Build a Chatbot Moderator for Anger Detection, Natural Language, Understanding, and Removel of Explicit Images, (Oct. 3, 2018), Retrieved from the Internet https://developer.ibm.com/tehnologies/artificial-intelligence/announcements/build-a-cognitive-moderator-microservice/, Retrieved Apr. 1, 2020.
Van Royen et al, "Thinking Before Posting? Reducing Cyer Harassment on Social Networking Sites Through a Reflective Message", Computers in Human Behavior, Pergamon, New York, NY, US, vol. 66, Oct. 8, 2016, pp. 345-352.
PCT/IB2020/051307, "International Search Report and Written Opinion of the International Searching Authority", Applicant FIDO VOICE SP. ZO.O., International Filing Date Feb. 17, 2020, dated Apr. 14, 2020.

\* cited by examiner

METHODOLOGY OF PRIOR ART
SYSTEMS AND METHODS FOR
DETECTING ONLINE VIOLENCE

PLAIN TEXT (INPUT)      302

```
┌─────────────────────────────────────────────┐
│ NORMALIZATION                               │
│  ┌───────────────────────────────────────┐  │
│  │        CHARACTER ENCODING        302A │  │
│  ├───────────────────────────────────────┤  │
│  │        REDUNDANT REPETITIONS     302B │  │
│  ├───────────────────────────────────────┤  │
│  │    TAGS / MARKERS / CODE SNIPPETS 302C│  │
│  ├───────────────────────────────────────┤  │
│  │             EMOTICONS            302D │  │
│  ├───────────────────────────────────────┤  │
│  │            CONTRACTIONS          302E │  │
│  ├───────────────────────────────────────┤  │
│  │            WHITESPACES           302F │  │
│  ├───────────────────────────────────────┤  │
│  │            SEGMENTATION          302G │  │
│  ├───────────────────────────────────────┤  │
│  │         ENTITY RECOGNITION       302H │  │
│  ├───────────────────────────────────────┤  │
│  │         OTHER NORMALIZATION      302I │  │
│  └───────────────────────────────────────┘  │
│                                         302 │
└─────────────────────────────────────────────┘
```

NORMALIZED TEXT (OUTPUT)      FIG. 5

NORMALIZED TEXT (INPUT)  304

CORRECTION

- COMMON TYPOS (STATISTICAL) — 304A
- COMMON TYPOS (RULE-BASED) — 304B
- GENERAL TYPOS — 304C
- WORD BOUNDARIES — 304D
- ENUMERATION / LISTING — 304E
- "STARS" (LETTER REPLACEMENT) — 304F
- LEET SPEAK — 304G
- PART-OF-SPEECH AGREEMENTS — 304H
- OTHER CORRECTION — 304I

304

CORRECTED TEXT (OUTPUT)

FIG. 6

CORRECTED TEXT (INPUT)     306

TRANSFORMATION

| TECHNICAL / STRUCTURAL | 306A |
| TO ABUSIVE | 306B |
| TO NON-ABUSIVE | 306C |
| TO BE DELETED | 306D |
| COREFERENCE RESOLUTION | 306E |
| OMISSION FULFILLMENT | 306F |
| ENTITY CONVERSION | 306G |
| GRAMMAR CONSTRUCTION | 306H |
| OTHER TRANSFORMATION | 306I |

306

TEXT PREPARATION OUTPUT
308

FIG. 7

*Ima cum 2 ur h0u$3... & \u2018mak sure\u2019 dat u w0n+ have kids !!!1!*

```
┌─────────────────────────────────────┐
│         NORMALIZATION               │
│                               302   │
└─────────────────────────────────────┘
```

*i am going to cum 2 ur h0u$3... and "mak sure" dat u w0n+ have kids!*

```
┌─────────────────────────────────────┐
│           CORRECTION                │
│                               304   │
└─────────────────────────────────────┘
```

*i am going to come to your house... and "make sure" that you will not have kids!*

```
┌─────────────────────────────────────┐
│         TRANSFORMATION              │
│                               306   │
└─────────────────────────────────────┘
```

*i am going to come to your house and i am going to make sure you will not have kids!*

FIG. 8

TEXT PREPARATION OUTPUT     402
308

VIOLENCE TOWARDS SECOND PERSON DETECTION

| | |
|---|---|
| PERSONAL ATTACKS | 402A |
| THREATS | 402B |
| BLACKMAILS | 402C |
| SEXUAL HARASSMENT | 402D |
| SEXUAL / CHILD EXPLOITATION | 402E |
| PERSUADING SUICIDE / SELF-HARM | 402F |
| PERSUADING VIOLENCE | 402G |
| SEX TRAFFICKING | 402H |
| OTHER SECOND PERSON VIOLENCE | 402I |

402

SECOND PERSON VIOLENCE (OUTPUT)   403

BLACKMAILS:

[punishable or non-punishable version]

- revealing information;

- damaging physical integrity;

- depriving of or damaging property;

- humiliation;

- ...

402C

402E

SEXUAL / CHILD EXPLOITATION:

- child grooming;

- nudity extortion;

- persuading sexual activity;

- intimate question;

- isolation;

404
TEXT PREPARATION OUTPUT
308
TRANSFORMATIONS TO SECOND PERSON
PERSONAL PRONOUNS
404A
NAMED ENTITIES
404B
MINORITY TERMS
404C
OTHER GROUP / INDIVIDUAL TERMS
404D
OTHER TRANSFORMATION
404E
404
VIOLENCE TOWARDS
SECOND PERSON
DETECTION
402
FIG. 13

502A

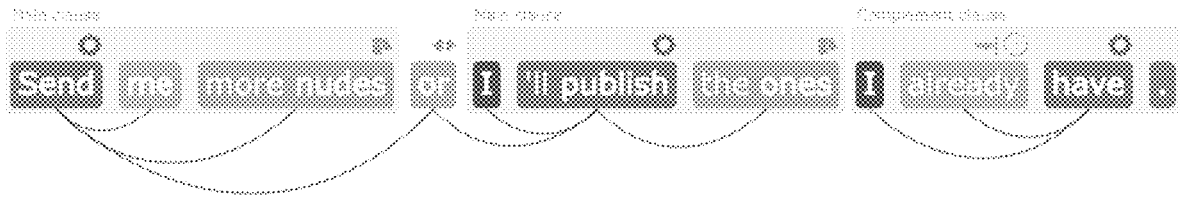

502B

[1] => array(23) {
  ["word_position"] => int(1)
  ["word_lex"] => string(4) "send"
  ["word_orig_lex"] => string(5) "Send "
  ["word_component"] => string(4) "core"
  ["word_tag"] => string(2) "VC"
  ["ner_id"] => int(0)
  ["ner_type"] => string(0) ""
  ["ner_content"] => string(0) ""
  ["phrase_type"] => string(9) "predicate"
  ["phrase_category"] => string(0) ""
  ["phrase_aspect"] => string(0) ""
  ["phrase_core_base"] => string(4) "send"
  ["clause_type"] => string(4) "main"
  ["clause_tense"] => string(14) "present simple"
  ["clause_construction"] => string(19) "positive imperative"
  ["sentence_id"] => int(1)
  ["clause_id"] => int(1)
  ["phrase_id"] => int(1)
  ["word_id"] => int(1)
  ["clause_to_clause_connection"] => int(2)
  ["clause_to_phrase_connection"] => int(1)
  ["phrase_to_phrase_connection"] => int(0)
  ["word_to_word_connection"] => int(0)
}

FIG. 17

SYSTEM AND METHOD FOR DETECTING UNDESIRABLE AND POTENTIALLY HARMFUL ONLINE BEHAVIOR

RELATED APPLICATIONS

The present application is a continuation of, relates to, and claims the benefit of priority to U.S. patent application Ser. No. 16/289,881 filed on Mar. 1, 2019, which claims benefit of priority to U.S. Provisional Patent Application No. 62/638,073, filed Mar. 3, 2018, which are hereby incorporated by reference herein in their entirety for all purposes as if fully set forth herein.

FIELD OF THE INVENTION

Inventions disclosed and claimed herein are in the field of natural language processing (NLP).

BACKGROUND

Online violence can be broadly defined as any form of abusing, harassing, bullying or exploiting other people, using electronic means. Some communication phenomena such as hate speech, toxic speech or abusive language overlap with online violence to some extent, whereas the other phenomena like cyberbullying or sexual harassment are entirely included into online violence. Online violence puts emphasis on harming other people. For example, using the word "Peking" as an intensifier to stress out the positive emotions towards other person, e.g. "you are Peking awesome", is not online violence.

A number of methods exist for detecting online violence, its subclasses or similar phenomena. Most of them utilize statistical learning techniques such as machine/deep learning, where a classification model is trained on a set of labeled examples. FIG. 2 is a block diagram of prior art online violence detection system 200. The input is a text, which is processed by Online Violence Detection System 202 consisting of Machine Learning Techniques 204 trained on Manually Annotated Corpus 206. Online Violence Detection System 202 produces Online Violence Detection System Output 208 which is then used by Other Systems/Applications 150.

Although the learning capabilities of statistical learning techniques are impressive, especially the ones utilizing deep artificial neural networks, this approach is lumbered with many important drawbacks, including (but not limited to):
1. It requires a large set of annotated examples for each category. Therefore, the systems built with this approach usually offer a very limited number of categories or even only a binary classification (e.g. toxic/non-toxic). Furthermore, the most dangerous phenomena are usually very rare so there is a problem in getting large enough labeled dataset to train an accurate classifier.
2. It tends to over-focus on certain keywords and expressions that often co-occur with online violence such as vulgarisms. For example, many statistical systems have problems recognizing even the simplest forms of negation such as "you are not an idiot" or recognizing non-abusive context in utterances like "rapists should spend rest of their life in prison."
3. It is vulnerable to adversarial attacks. Adversarial examples are inputs to machine learning models that an attacker has intentionally designed to cause the model to make a mistake. In terms of online violence detection, it can be: word changes (e.g. inserting a typo), word-boundary changes (e.g. inserting or removing whitespaces), or word appending (e.g. inserting positive non-hateful words).
4. It is a "blackbox" as it is impossible to say why the system made certain decision. One cannot track the decision-making process and cannot change anything within the model other than by retraining it on a different dataset or changing the learning algorithm or the architecture. It has a number of negative consequences, but the most obvious are significant difficulties in developing and maintaining such system.
5. It strongly depends on the annotation quality and the data source used for training. A statistical model trained on one data source (e.g. Twitter) shows a significant drop in accuracy when used on other data source (e.g. Reddit). The same applies to the annotation quality. If a model was trained using given annotation guidelines, it will not work well for other guidelines. Furthermore, if the annotation contains mistakes, it will affect the model's performance.

Statistical models achieve low precision that effectively excludes the systems using such models from being used as proactive prevention instead of post factum moderation within a human-in-the-loop model. According to other limitations, such systems are not effective in detecting rare online violence phenomena and can be easily cheated or spoofed with adversarial examples. The latter affects the recall of such systems when applied to real online communities, especially if the users know that there is an online violence detection system monitoring their communication. Furthermore, such systems cannot be customized or relatively quickly adjusted to different services, data sources and guidelines, which is an important market need.

On the other hand, symbolic systems demonstrate even more severe drawbacks, which exclude them from the mainstream in both academic and industry applications. Due to the lack of learning capabilities, symbolic systems mostly rely on hand-crafted rules and knowledge bases. The process of building rules and knowledge bases is tedious, expensive and usually requires a number of well-educated specialists representing a range of disciplines such as computer science, linguistics, psychology, and so on. Furthermore, as the complexity of such system increases, it becomes very hard, and sometimes nearly impossible, to develop and maintain these systems.

It would be desirable to have an online violence detection system that combines the advantages of symbolic and statistical approaches, greatly reducing or even eliminating the individual drawbacks of each of them. It would be desirable to have an online violence detection system that is able to detect and name a range of online violence phenomena, including the rare dangerous phenomena, with both high precision and recall. High precision would be an enabling factor for changing the way in which online services handle the problem of online violence—from post factum moderation within the human-in-the-loop model to automatic prevention allowing the blocking of dangerous content before the damage is done. It would be desirable to have an online violence detection system that deeply analyzes the context in order to precisely detect complex and non-obvious online violence cases, and to prevent raising too many false alarms. It would be desirable to have a method for building and developing such online violence detection system that do not require large sets of annotated data, or even to enable such online violence detection system to learn directly from unlabeled datasets. Such a method should allow the labeled and unlabeled datasets to be drawn upon in order to make the system better, but should not make the system dependent on those datasets. It would be desirable to have an effective method for incorporating the knowledge of experts such as psychologists, sociologists, pedagogues, psychiatrists into the system, and for customizing and adjusting the system to new data sources, community guidelines, and other client's needs. It would be desirable to have a method for developing and maintaining such system that allows to precisely find the root causes of errors and problems, to plan the development short- and long-term, and to build the development teams that could work on different aspects of the system independently.

BRIEF DESCRIPTION OF THE DRAWINGS

FIG. 5 is a block diagram of normalization (part of text preparation) according to an embodiment.

FIG. 6 is a block diagram of correction (part of text preparation) according to an embodiment.

FIG. 7 is a block diagram of transformation (part of text preparation) according to an embodiment.

FIGS. 8-9 are diagrams illustrating the process of text preparation according to an embodiment.

FIG. 11 is a block diagram of violence towards second person detection (part of detection engine) according to an embodiment.

FIG. 12 is a diagram illustrating the division of online violence phenomena into sub-classes according to an embodiment.

FIG. 13 is a block diagram of transformations to second person (part of detection engine) according to an embodiment.

FIG. 17 is a diagram illustrating syntactic parser output according to an embodiment.

DETAILED DESCRIPTION

The present invention relates to computer-implemented methods and systems for detecting undesirable and potentially harmful online behavior. The embodiments described and claimed could also be applied to detecting any other type of online behavior to be detected, but the descriptions focus on detecting online violence. More particularly, the embodiments disclosed relate to detecting online violence using symbolic methods of natural language processing (NLP) that utilize and govern the usage of: 1) syntactic parser for analyzing grammatical context of the input text data, 2) unsupervised learning methods for improving selected aspects of the system and adjusting the system to new data sources and guidelines, and 3) statistical classifiers for resolving specific well-defined sub-tasks, in which statistical approaches surpass the symbolic methods. The online violence detection system comprises a hierarchical modular architecture, utilizing contextual models to detect specific well-defined online violence phenomena. The contextual models are built using the above-mentioned methods and organized into modules and submodules of increasing complexity representing responding types and subtypes of online violence.

Embodiments of inventions disclosed herein include improvements on current NLP systems and methods for an automatic detection of online violence by processing input that consists of text from different types of context. The input text can be obtained from any source of electronic data that could serve as a source of text input to the NLP system, including (but not limited to): plain text, text files, word processing documents, CSV files, XML, files.

Figure 1:
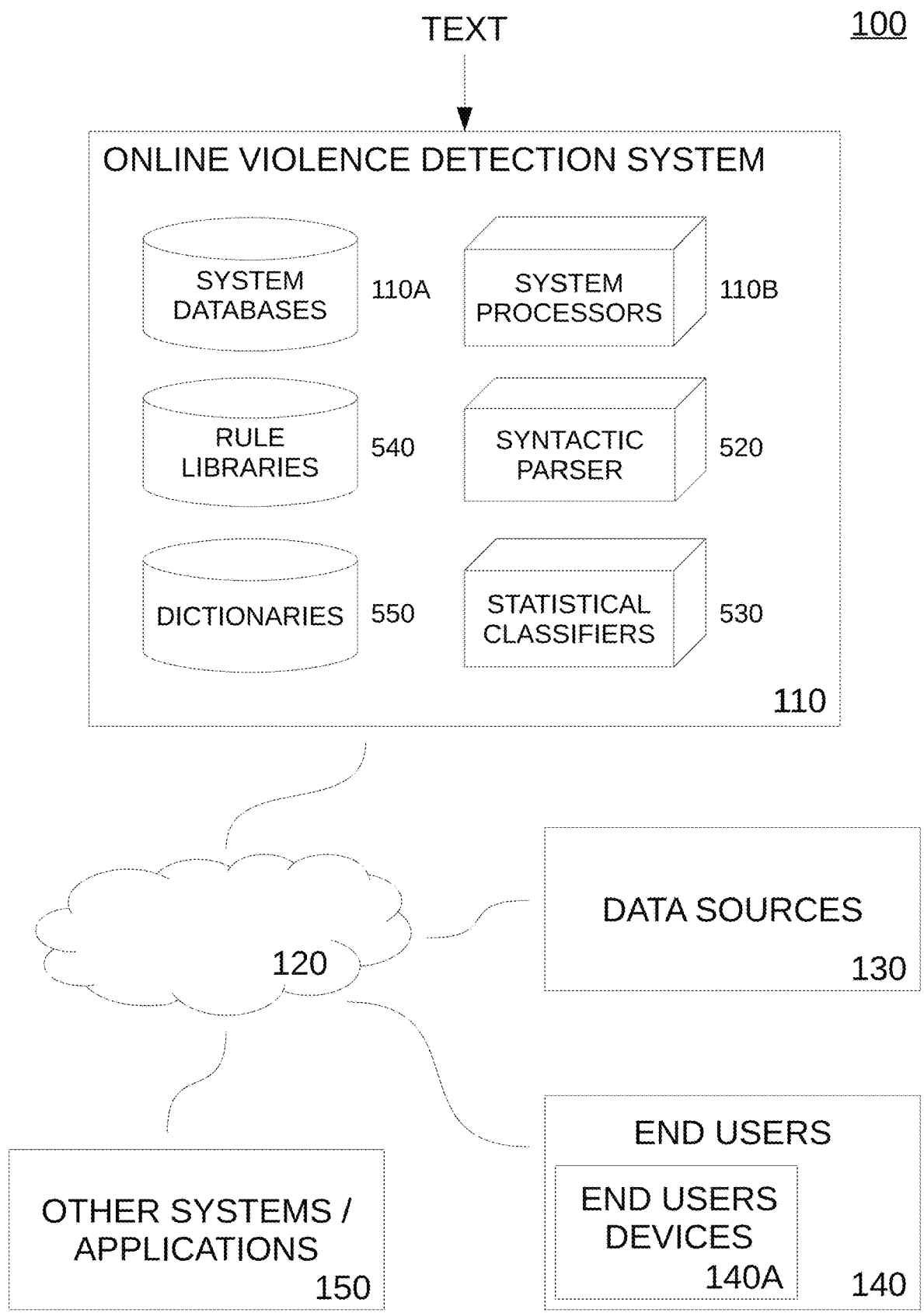
FIG. 1 is a block diagram of an online violence detection system environment according to an embodiment.
Figure 2:
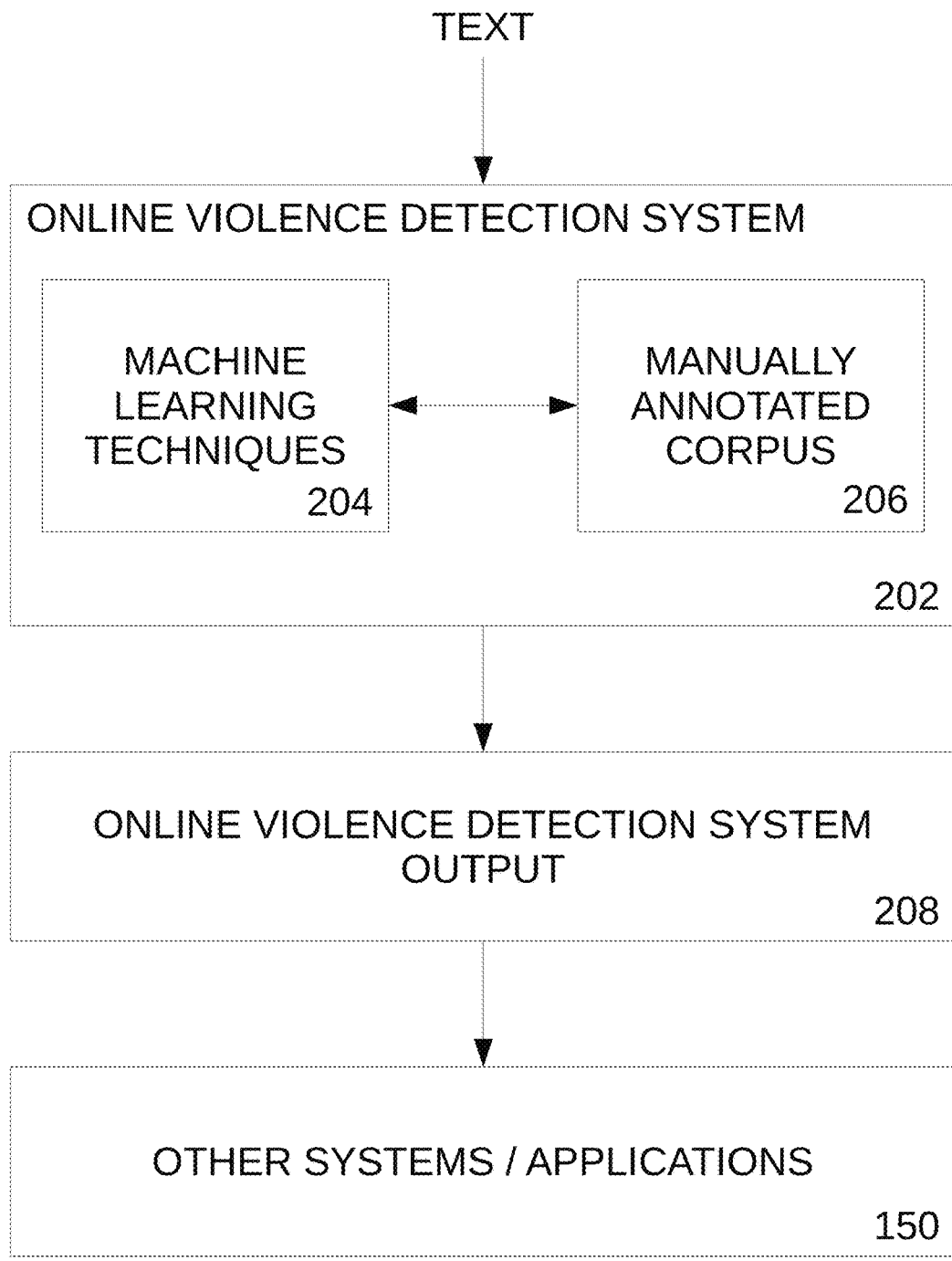
FIG. 2 is a block diagram of a prior art online violence detection system.

FIG. 1 is a block diagram of an online violence detection system environment 100 according to an embodiment. Online Violence Detection System 110 accepts text as input. Text can include electronic data from many sources, such as the Internet, physical media (e.g. hard disc), a network connected database, etc. Online Violence Detection System 110 includes multiple System Databases 110A, Dictionary 540 databases and Rule Libraries 550 databases, and multiple System Processors 110B, Syntactic Parser 520 processors and Statistical Classifiers 530 processors. Databases 110A, 540, 550 and processors 110B, 520, 530 can be located anywhere that is accessible to a connected network 120, which is typically the Internet. Databases 110A, 540, 550 and processors 110B, 520, 530 can also be distributed geographically in the known manner. Data Sources 130 include any source of electronic data that could serve as a source of text input to Online Violence Detection System 110.

Other Systems/Applications 150 are systems, including commercial and non-commercial systems, and associated software applications that have the capability to access and use the output of Online Violence Detection System 110 through one or more application programming interface (APIs) as further described below. For example, Other Systems/Applications 150 can include:

- an online application offering its users a chatting option that is monitored for online violence and proactively moderated by blocking messages containing online violence before they reach the receiver (online violence prevention),
- a mobile application for parents that monitors their children's online communication and alerts when children is exposed to online violence.

End Users 140 includes individuals who might use Other Systems/Applications 150 through one or more of End User Devices 140A. End User Devices 140A include without limitation personal computers, smart phones, tablet computers, and so on. In some embodiments, End Users 140 access Online Violence Detection System 110 directly through one or more APIs presented by Online Violence Detection System 110.

Online violence (or cyber violence) is any form of abusing, harassing, bullying or exploiting other people, using electronic means. In other words, the term "online violence" used in this document should be understood in the broadest sense—as any activity or behavior of online communication that can harm or lead to harming other people, with the strong emphasis on (but not limited to) protecting an interlocutor. Phenomena such as personal attacks, sexual harassments, cyberbullying, threatening, blackmailing naturally fall to this category. For reasons of clarity, also some non-obvious phenomena are included into this category, such as: sexting, sex trafficking, racism, sexism, violence against minorities, persuading self-harm and violence against others. According to the definition, each of these phenomena can be seen as an example of abusing, harassing, bullying or exploiting other people, using electronic means. For example, sexting can be seen as an example of exploitation or harassing if one knows that the receiver of the message is a child that should not be presented with such content. Another special emphasis is put on protecting children, and therefore online violence covers any violent, harming or exploiting phenomena targeted against children, including: child grooming, child exploitation, pedophile attacks, extortion or coaxing of impropriate items or actions (e.g. nude pictures), and so on. Additionally, declaration of self-harming is included to online violence as an exception since it does not fulfill the definition. Although it is not targeted against other people, it is a very dangerous phenomenon that should be detected in order to prevent putting words into action.

The system and method comprise a novel approach to online violence detection that combines statistical methods (including machine and deep learning models) under the strict government of the symbolic processing, strongly relying on grammar structure. The system and method can be characterized by two important advantages in comparison to the state of the art approaches: high precision and broad division into diverse online violence phenomena.

High precision is an enabling factor for the detection system to be used for active prevention rather than post factum moderation. Current systems achieve low precision which results in a large number of false alarms. Taking an automatic action against a user detected with low precision system is very risky because such action can be a false accusation that effectively leads to the user's dissatisfaction or even resignation from using the service. Therefore, current system can be used as an aid for human moderation, not as an autonomous prevention system.

Broad division allows the assignment of a specific action to a specific detected phenomenon. The system and method allows the building and execution of narrow specialized detection models with a minimal amount (or even none) of training data. For example, one can set up different reactions for the detection of personal attacks, blackmailing and child grooming. Furthermore, some narrow models such as detection of nude picture extortion can be used to educate the potential victim, e.g. by informing that it is okay to tell parents and not fulfill these requests.

Figure 3:
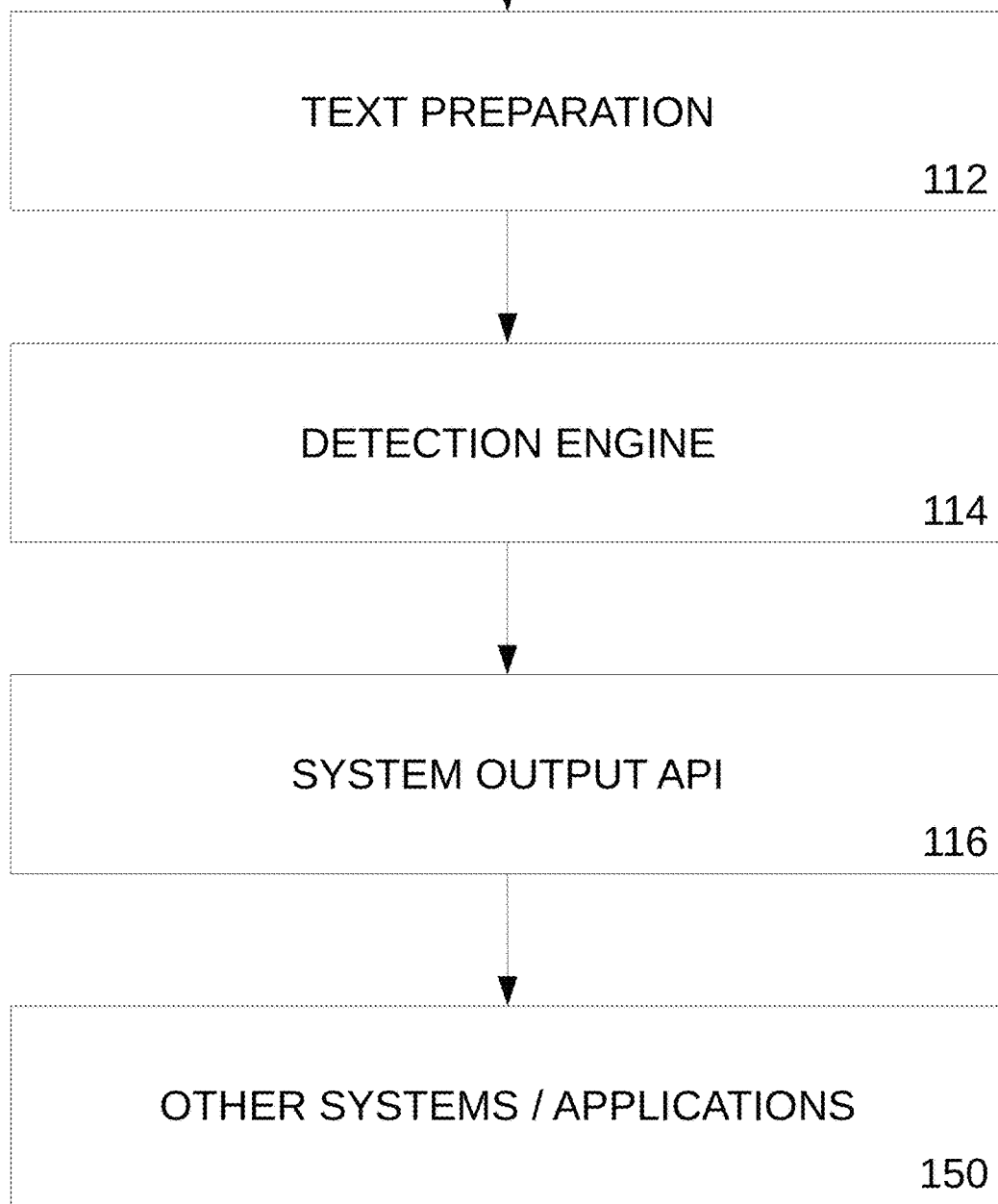
FIG. 3 is a block diagram of an online violence detection system according to an embodiment.

FIG. 3 is a block diagram illustrating the high-level architecture of the inventions according to an embodiment. Input text is received by Text Preparation 112. Text Preparation 112 is responsible for preparing the input text to be further processed by Detection Engine 114. Detection Engine 114 is responsible for determining if the input text contains online violence and—if so, what is the category of detected online violence. The output of the Detection Engine 114 is referred to here as System Output API 116, and can be operated on by a variety of downstream software applications or systems as described in this document, referred to here as Other Systems/Applications 150. Although the output of the system is referred as Application Programming Interface (API) in System Output API 116, any reasonable alternatives are possible.

Text Preparation

Detection Engine 114 requires a normalized and corrected text to operate. The goal of Text Preparation 112 is to perform a broad set of text manipulation operations in order to convert the input text into the text of the form required by Detection Engine 114. Text Preparation 112 is the only of the two system's components that allows the manipulation of the text string by changing, adding or removing the substrings. The original text string is preserved as a separated entity "text_orig."

Figure 4:
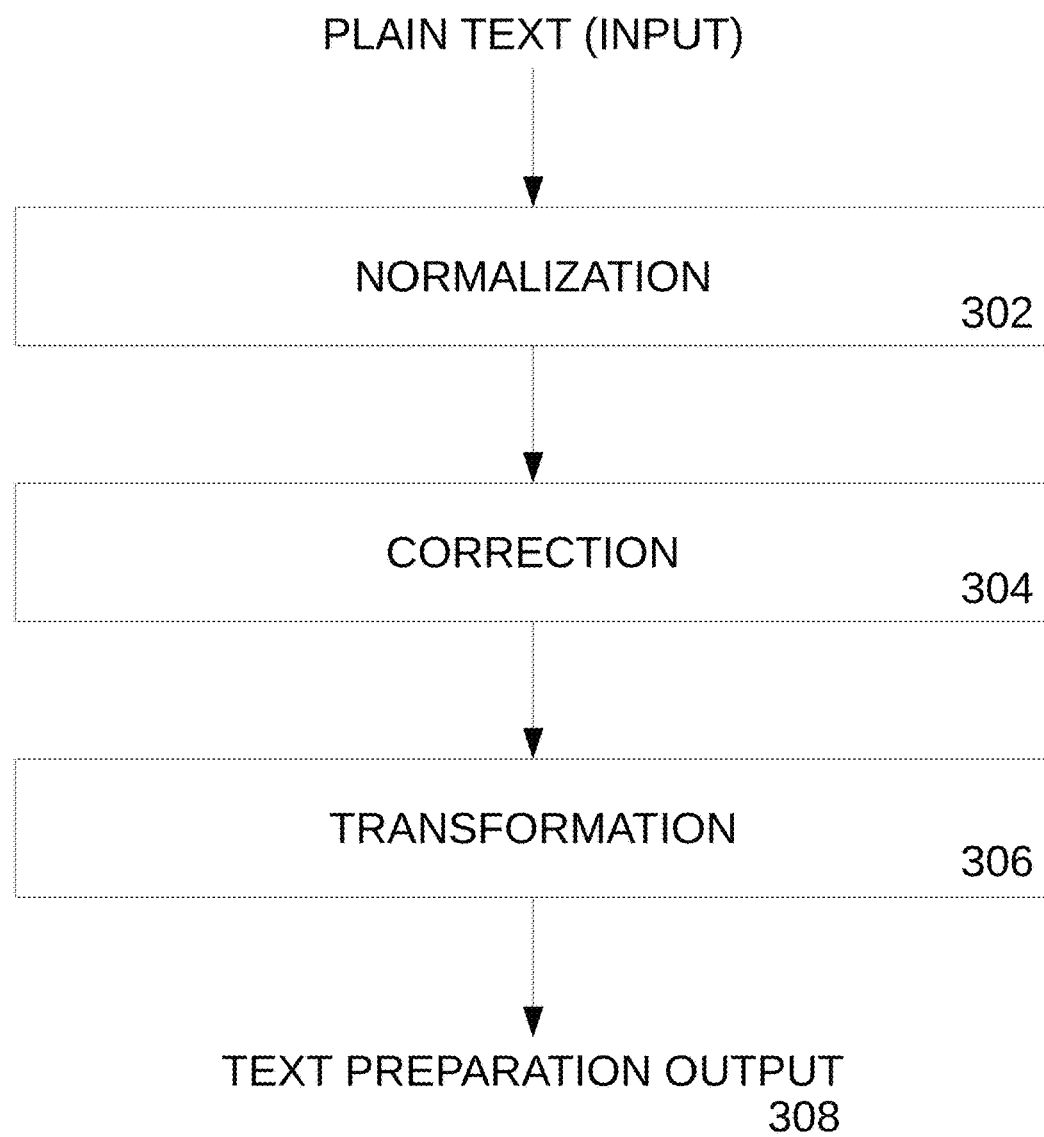
FIG. 4 is a block diagram of text preparation according to an embodiment.

FIG. 4 is a block diagram showing the process of Text Preparation 112 according to an embodiment. The input of Text Preparation 112 consists of plain text. The process of Text Preparation 112 comprises three consecutive modules: Normalization 302, Correction 304, and Transformation 306. The standard process utilizes one time pass. However, it is possible to perform subsequent passes if needed. Every Text Preparation 112 module has an access to all of the system's assets, features and functions such as syntactic parser, statistical classifiers, dictionaries and libraries. Any of these resources can be used in any module and submodule. Normalization 302 comprises the process of adjusting an input text into a predefined standard format.

FIG. 5 is a block diagram providing detailed division of Normalization 302 into a set of submodules realizing specific tasks.

Character Encoding 302A is responsible for converting all characters in input text to a default encoding, including characters and character codes in any known form (e.g. "\u2018", "0x2018"). Redundant Repetitions 302B deletes a variety of well-defined sub-string repetitions in input text, including (but not limited to):

repetitions of letters (more than two to two as there are no English words with more than two occurrence of the same letter),
repetitions of words (with exception for meaningful repetitions such as proper nouns),
repetitions of whole utterances,
repetitions of punctuation marks.

Tags/Markers/Code Snippets 302C deletes or changes to acceptable words and characters a variety of usage of markups and formal (not natural) languages, including (but not limited to): HTML tags, BBCode tags, CSS styling, source-related tags, any known programming language code snippets.

Emoticons 302D deletes or changes detected emoticons (including various styles such as western style, kaomoji) into acceptable words and characters. Each emoticon is changed into descriptive expression from an input text language, e.g. ":-(" can be changed to "i am sad." sub-string.

Contractions 302E expands shortened versions of the written forms of a words into their full normalized version, e.g. "you're" into "you are." It also covers unambiguous incorrect contractions such as "youre" into "you are," but not "hell" as it can be "he will" as well as the word "hell."

Whitespaces 302F normalizes any occurrence of whitespaces, including (but not limited to): spaces, tabulations, next lines. The normalization can be different for different occurrences of the same whitespace.

Segmentation 302G is responsible for controlling the sentence division. It detects and inserts omitted full stops, and handles scattered text pieces (e.g. using certain whitespaces or tags introducing tabulations or new lines). It also secures the usage of dots in abbreviations.

Entity Recognition 302H covers the recognition of a variety of well-defined entities, including (but not limited to):

numbers,
series of numbers,
mathematic equations, date/time information,
publication/article details (e.g. publication date, references),
identification numbers (IDs),
telephone/fax numbers,
IP addresses,
email addresses,
Uniform Resource Locators (URLs),
geographic coordinates,
money amounts,
filenames,
domain- and source-specific entities (e.g. Reddit username and subreddit conventions).

The recognized entities are changed into a normalized form that is further handled by Detection Engine 114 and other Text Preparation 112 modules.

Other Normalization 302I covers every other normalization that does not fall into the above-mentioned modules.

Correction 304 (as described below with reference to FIG. 6) comprises the process of revising the normalized text in order to remove misspellings and any other errors and obstacles that may impede the work of Detection Engine 114. The process of Correction 304 (its every submodule) utilizes two major approaches:

dictionary-based—using various algorithms for calculating "distances" (or similarity metrics) between misspelled words and correct dictionary entries; it may result in a replacement or in generating a list of possible candidates;

context-based—using various algorithms for selecting a proper candidate by establishing what is required within a given context; it may find a replacement by itself or use a list of candidates for other module or method, including the usage of dictionary-based correction; examples of context-based correction: "its a miracle" into "it is a miracle", "you are eal stupid" into "you are really stupid."

FIG. 6 is a block diagram providing detailed division of Correction 304 into a set of submodules realizing specific tasks.

Common Typos (Statistical) 304A replaces incorrectly written words with their correct version based on statistical data, e.g. "accomodation" into "accommodation." The statistical data can come form any source, including (but not limited to):

existing databases of common typos,
dedicated submodules (internal or external) that builds up the dictionaries and patterns based on processing text corpora (either labeled or unlabeled),
built-in mechanisms allowing system's users to correct the data manually and collecting their activities (those can be used directly or as a training dataset for machine learning correction modules).

Common Typos (Rule-based) 304B utilizes trial and error method for replacing common patterns that are often misspelled, e.g. "-ht" into "-th", "-in" into "-ing", "ae" into "ea." The modified words are validated against the available dictionaries.

General Typos 304C is the main submodule combining various techniques for correcting typos. Its core comprises the measurement of word distances that can be further parametrized according to the source of data and other aspects (e.g. cost of letter changes based on keyboard arrangement, sensibility to bad language, homophones). The parameters can be adjusted manually, semi-automatically or automatically, based on processing of unlabeled datasets from a given data source.

Word Boundaries 304D resolves situations where the boundaries of words are incorrectly changed. The submodule takes into consideration intentional changes, including:
splitting (e.g. "you are s t u p i d."),
joining (e.g. "youarestupid."),
combination of splitting and joining (e.g. "y ouares t u p id.").

Additionally, the submodule resolves ambiguous usages of dash and hyphen, detecting its desired function and deciding if it should be removed, preserved, changed from one to another (e.g. dash to hyphen) or changed into other more suitable character (e.g. colon).

Enumeration/Listing 304E resolves any (complete and partial) usage of enumeration and listing in input text. The enumeration/listing markups are removed or changed in order to not interfere segmentation or any other operations that take into consideration sentence boundaries. The submodule tries to make the best decision based on the type and supposed purpose of the enumeration/listing. For example, enumerations/listings of words and phrases are often separated with commas, whereas sentences are separated with full stops. Furthermore, the submodule normalizes the usage of commas and conjunctions.

"Stars" (Letter Replacement) 304F resolves situations where one or more letters in a word is/are replaced with other non-letter characters (e.g. "*", "#", "."). This kind of replacement within abusive words is often used to mislead the detection system. The submodule allows to correct even the words with altered beginnings as well as with the combination of different characters. It validates 1-to-1 replacement as well as any other options such as 1-to-many, many-to-1, many-to-many, 1-or-many-to-zero.

Leet Speak 304G resolves letter replacements related to so-called leet speak, a system of modified spellings. Leet speak often replaces letters with similarly looking characters or modifies words based on a system of suffixes and alternate meanings. The submodule replaces the replacements with the correct letters, e.g. "1 h4t3 y0v" is changed into "I hate you", "1 h0p3 u d13" into "I hope you die."

Part-of-speech Agreements 304H resolves syntactic errors based on desirable part-of-speech patterns. The submodule makes use of the fact that certain combinations of parts-of-speech in certain order are highly unlikely or even impossible. Examples: "you are real stupid" into "you are really stupid", "their a bunch of idiots" into "there are a bunch of idiots."

Other Correction 304I covers every other correction that does not fall into the above-mentioned modules.

As default, Correction 304 performs two passes in order to spot any combination of the above-mentioned phenomena. Furthermore, the submodules can overlap and therefore it is possible to correct any reasonable combination such as Leet Speak 304G and Word Boundaries 304D—"@ $ $ h 0 1 3" is changed into "asshole." It is also possible to set triggers executing additional passes based on various parameters, e.g. percentage of dictionary-verified words.

Transformation 306 comprises the process of revising the corrected text in order to make it more suitable for Detection Engine 114. The main goal of Transformation 306 is to remove ambiguity of input text by performing well-defined string manipulations. FIG. 7 is a block diagram providing detailed division of Transformation 306 into a set of submodules realizing specific tasks.

Technical/Structural 306A provides changes within general structure of texts and sentences, such as punctuation and segmentation-related indicators. There are two major aspects of this submodule:

sentence merging/splitting—if consecutive sentences make more sense as a single sentence, or if a single sentence makes more sense as separated sentences, they are merged together or split up (additional connector can be added if required), e.g. "This dress. Is beautiful. You are not." is changed into "This dress is beautiful, but you are not."

comma insertion/deletion—if a comma is incorrectly omitted (or a sentence is more comprehensible with a comma), or a comma is redundant, the comma is added to/removed from the sentence, e.g. "Read my page idiot." is changed into "Read my page, idiot."

To Abusive 306B replaces expressions (words, phrases, etc.) that are abusive in a given context but were softened or deprived of coarse language in order to hide the bad intention (euphemisms, idioms, etc.) with a single semantically equivalent expression that means the same and is unambiguous (or strictly abusive), e.g. "up your bottom" is changed into "up your ass", "polishing the spear" into "masturbating." All of the semantic transformations are convertible and preserve all the available information such as appropriate grammar forms such as verb forms, e.g. "i saw you shook your meat yesterday" is changed into "i saw you masturbated yesterday."

To Non-abusive 306C is a reciprocal of To Abusive 306B. It replaces expressions that are not abusive but contain bad language with clearly non-abusive expressions. It lowers the probability of incorrect interpretation of such expressions. For example, "raping your inbox" is changed into "spamming your inbox", "being the shit" into "being the best." All of the semantic transformations are convertible and preserve all the available information.

To Be Deleted 306D removes expressions (words, phrases, etc.) that are irrelevant to the meaning in a given context, such as part of interjections (e.g. "wow", "oh"), part of internet slang abbreviations (e.g. "lol", "rofl"), part of onomatopoeias (e.g. "blah blah", "hahaha") and word "that" when it can be omitted (e.g. "i hope that you die" is changed into "i hope you die"). Furthermore, the module can detect abusive words used as intensifiers and remove them as well, e.g. "you are fucking awesome" is changed into "you are awesome." Alternatively, the intensifiers can be handled by the To Non-abusive 306C module.

Coreference Resolution 306E replaces referring expressions such as pronouns with the right entities that they refer to. It simplifies the detection process as usually the simpler relations need to be detected. The submodule operates on any referring expressions, not only pronouns. It also allows to distinguish nominal and adjectival aspects of the entities. For example, "jews are greedy. i hate their religion." is changed into "jews are greedy. i hate jewish religion.", "i saw your mom yesterday. she is fat like a pig." into "i saw your mom yesterday. your mom is fat like a pig."

Omission Fulfillment 306F fulfills (usually using "copy and paste" method) expressions (words, phrases, etc.) that can be omitted in natural human communication, but their absence can be problematic for the system to understand the context, including (but not limited to):

cloning subject+part of predicate if needed, e.g. "you need to crawl under a rock and die" is changed into "you need to crawl under a rock and you need to die", cloning subject+predicate, e.g. "why do not you send me $1000. if not, i will kill your dog." is changed into "why do not you send me $1000. if you do not, i will kill your dog.", cloning infinitive particle "to", e.g. "i am going to hunt you down and murder you violently" is changed into "i am going to hunt you down and to murder you violently."

Additionally, Omission Fulfillment 306F fulfills words that are incorrectly omitted, based on a validation of grammar correctness. The algorithm fulfill the lack with the most probable word based on a given context. This aspect is similar to Part-of-speech Agreements 304H from Correction 304 module. For example, "you an idiot" is changed into "you are an idiot", "you should nice to your mom" into "you should be nice to your mom."

Entity Conversion 306G detects named entities and other strings that can be considered to be abusive in a given context, including (but not limited to):

person/brand/music band names,
song/movie/book/TV show title,
famous quotes,
song lyrics.

Detected entities and strings are replaced with equivalents that are neutral to Detection Engine 114, e.g. "john tucker must die" is replaced with "movie title."

Grammar Construction 306H covers the transformation of a well-defined part of the grammar constructions that either exclude the otherwise violent utterance from being detected or changes the non-violent utterances in order to become detectable by Detection Engine 114. There are three major constructions handled by this submodule:

quoting—using explicit utterances (direct speech) of other people, e.g. "he said: 'you are an idiot,' and left the room."

reported speech—expressing other people's utterances without quoting them, e.g. "he said that you are an idiot."

calling x y—this is a collective name for a group of constructions that indirectly assign an abuse to an object, e.g. "i am sorry for calling you an idiot."

The other part of constructions excluding the otherwise violent utterance from being detected is covered by Contradiction Checking which is broadly described in Detection Engine section.

Every grammar construction can be placed in any of these two submodules. A decision where a given construction should be placed (Grammar Construction 306H or Contradiction Checking) depends on soft guidelines:

any form of expressing other people's utterances should be placed in Grammar Construction 306H, expressions that require to check both sides of the potentially detected statement (what is before and after) should be placed in Grammar Construction 306H, counter-factual expressions should be placed in Contradiction Checking, negation-related expressions should be placed in Contradiction Checking, specific constructions (applicable to only a part of detection models) should be placed in Contradiction Checking.

The information about detected grammar construction is passed through the whole detection process so it is possible for the system to tell that the utterance contains certain category of online violence (e.g. direct personal attack), but the violence occurred in a quote. Grammar Construction 306H can replace detected content with anything neutral to Detection Engine 114.

Other Transformation 306I covers every other transformation that does not fall into the above-mentioned modules.

Figure 9:
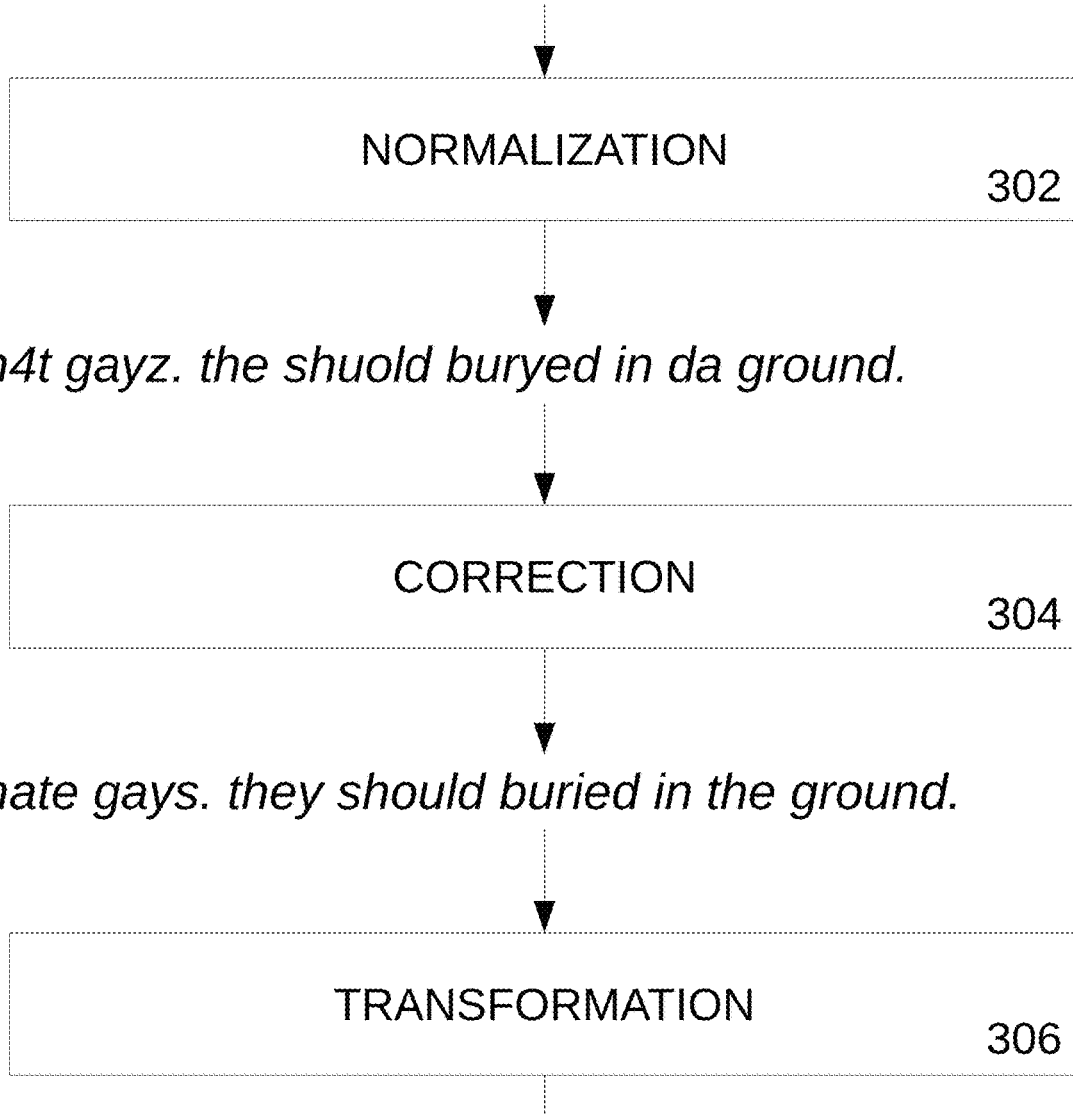

FIGS. 8-9 are diagrams illustrating a process of Text Preparation 112 module according to an embodiment. Referring to FIG. 8, the input to Text Preparation 112 module is the text "Ima cum 2 ur h0u$3 . . . & \u2018mak sure\u2019 dat u w0n+have kids ! ! !1!" According to Normalization 302, five submodules are used: Character Encoding 302A, Redundant Repetitions 302B, Tags/Markers/Code Snippets 302C, Contractions 302E, and Whitespaces 302F. After Normalization 302, the input text for Correction 304 is: "i am going to cum 2 ur h0u$3 . . . and "mak sure" dat u w0n+have kids!" According to Correction 304, three submodules are used: Common Typos (Statistical) 304A, General Typos 304C, and Leet Speak 304G. After Correction 304, the input text for Transformation 306 is: "i am going to come to your house . . . and "make sure" that you will not have kids!" According to Transformation 306, three submodules are used: Technical/Structural 306A, To Be Deleted 306D, and Omission Fulfillment 306F. The output of Text Preparation 112 module is: "i am going to come to your house and i am going to make sure you will not have kids!" Referring to FIG. 9, the input to Text Preparation 112 module is: "I HaT GAYZ, . . . , . . . <br>tHe SHuOLD BuRyED iN Da GRoUnD . . . " According to Normalization 302, two submodules are used: Redundant Repetitions 302B, and Tags/Markers/Code Snippets 302C. According to Correction 304, four submodules are used: Common Typos (Statistical) 304A, Common Typos (Rule-based) 304B, General Typos 304C, and Leet Speak 304G. According to Transformation 306, two submodules are used: Coreference Resolution 306E, and Omission Fulfillment 306F. The output of Text Preparation 112 module is: "i hate gays. gays should be buried in the ground."

Detection Engine

Figure 10:
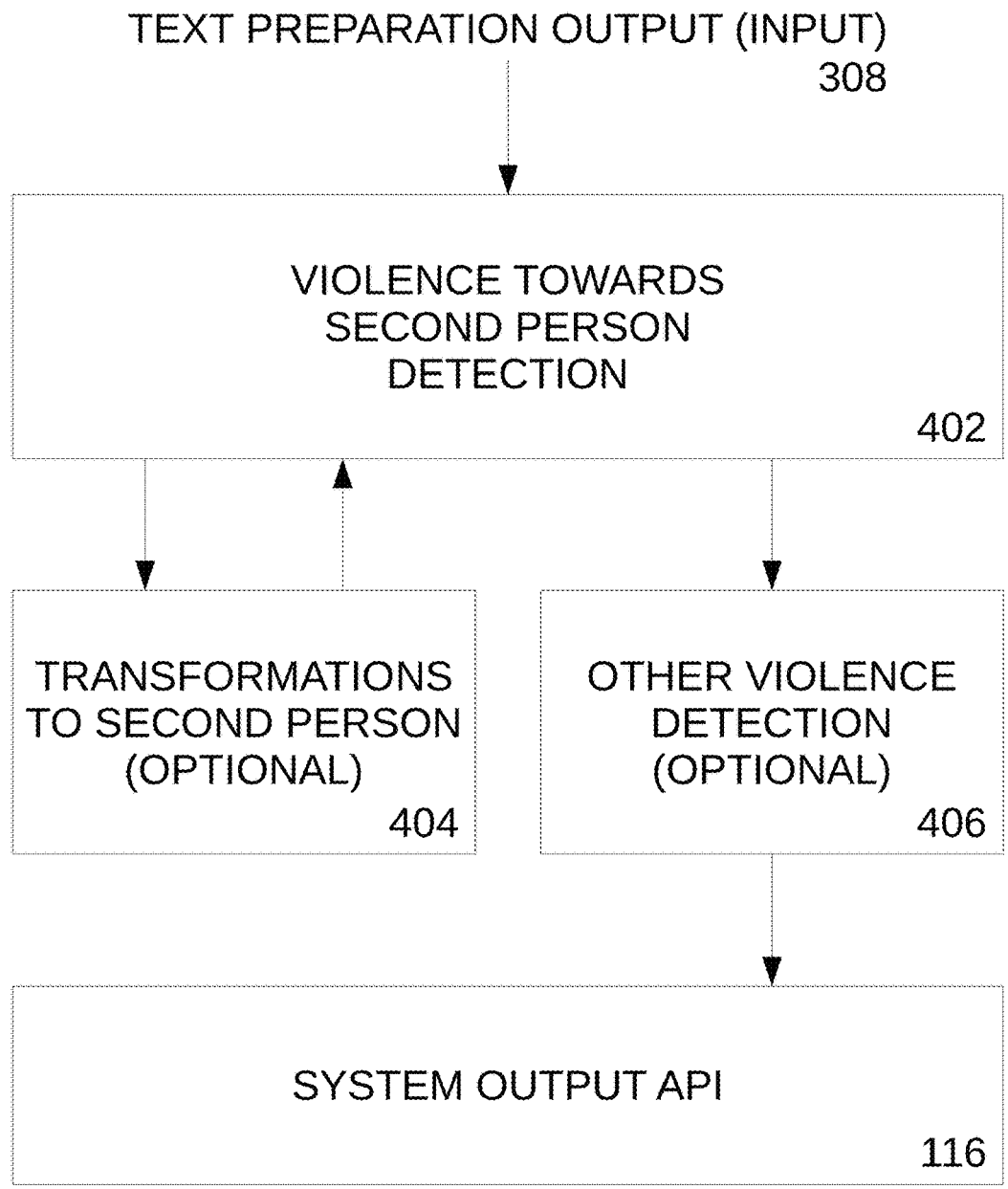
FIG. 10 is a block diagram of detection engine according to an embodiment.

Referring briefly to FIG. 3, the output of Text Preparation 112 is received by Detection Engine 114 module. FIG. 10 is a block diagram of Detection Engine 114 module architecture according to an embodiment. In an embodiment, Detection Engine 114 comprises three submodules: Violence Towards Second Person Detection (VTSPD) 402, Transformations To Second Person (TTSP) 404, and Other Violence Detection (OVD) 406. According to an embodiment, only Violence Towards Second Person Detection (VTSPD) 402 is obligatory, the other two submodules are optional, but allow to expand the detection process to online violence phenomena targeted against any other objects than interlocutor. Other embodiments allow to include more submodules, following the same architecture described in this document.

Violence Towards Second Person Detection (VTSPD) 402 comprises the core of Detection Engine 114 as potentially the most damaging online violence phenomena are targeted against an interlocutor. VTSPD utilizes a set of contextual models for detecting certain types of online violence. A contextual model can be seen as a complete functioning detection model for detecting a single well-defined category of online violence. Although the contextual models are independent, they can overlap each other (e.g. a given violent sentence can be detected by more than one contextual model). Furthermore, contextual models can utilize the same system's assets such as dictionaries or rule libraries. According to an embodiment, contextual models related to certain type of online violence are grouped together as a submodule of Detection Engine 114, defining the target of online violence—an interlocutor in case of Violence Towards Second Person Detection (VTSPD) 402. Other embodiments may comprise different functional structure.

FIG. 11 is a block diagram providing detailed division of Violence Towards Second Person Detection (VTSPD) 402 into a set of contextual models detecting certain types of online violence. As contextual models are independent from each other, their order is completely arbitrary. All of the following contextual models are presented as components of VTSPD and therefore the terms "interlocutor" and "second person" are used to point out the target of online violence. Aside from obvious second person indicators (such as pronoun "you"), VTSPD also covers online violence targeted against interlocutor's relatives and other persons/things important for the interlocutor. Therefore, whenever the terms "interlocutor" and "second person" are used, the broader definition should be concerned. According to an embodiment, violence towards other persons is detected using VTSPD after performing Transformations To Second Person (TTSP) 404. Other embodiments may comprise different functional structure.

Contextual models can be further divided into contextual sub-models which detect particular online violence phenomena within a given type of online violence. The following description of contextual models contains exemplary divisions into online violence phenomena. Such division can be a resemblance of the division into contextual sub-models. For the demonstration purpose, in case of two sub-models—Blackmails 402C and Sexual/Child Exploitation 402E, the division into contextual sub-models will be presented explicitly. All examples in the following section are presented as they would be after Text Preparation 112. It means that the exemplary texts are lowercase and do not have contractions, abbreviations, misspellings, and other elements corrected and normalized in Text Preparation 112.

Personal Attacks 402A detects any forms of abusive remarks on or relating to an interlocutor, including (but not limited to):
  direct abuses, e.g. "you are an idiot",
  indirect abuses, e.g. "stop acting like an idiot",
  abusive comparisons, e.g. "you smell like a skunk",
  abuses using vocative case, e.g. "hold on, idiot",
  part of cyberbullying related with personal remarks, e.g. "your parents were paid to adopt you."

Threats 402B detects any forms of threats, bad intentions and bad wishes towards an interlocutor, including (but not limited to):
  direct threats, e.g. "i am going to kill you",
  indirect threats, e.g. "sooner or later we will get you",
  implied threats, e.g. "i know where you live",
  intentions and wishes for harming an interlocutor, e.g. "i wish you have aid",
  regrets for non-harming an interlocutor, e.g. "too bad your family is not dead." Blackmails 402C detects blackmails, coercions and part of extortions. FIG. 12 illustrates the division of Blackmails 402C into contextual sub-models. Four contextual sub-models are disclosed (there are more):
  revealing information, e.g. "give me money or your parents will find out you are gay",
  damaging physical integrity, e.g. "give me money or I will kill you",
  depriving of or damaging property, e.g. "hire me or i will set fire to your car",
  humiliation, e.g. "give me your pocket money or i will clean the bathroom floor with your clothes."

Blackmails 402C contextual sub-models are therefore classified by the type of threat in case of not fulfilling the blackmailer's request. Referring to FIG. 12, Blackmails 402C contextual sub-models appear in two versions which is mapped into the output categorization. Each sub-model can be detected as punishable or non-punishable—punishable blackmail and extortion acts typically use threats of criminal prosecution in accordance with the American law. This classification can be adjusted to any other law system if needed. It is worth noting that due to the threat-related classification, Blackmails 402C shares the system's assets (dictionaries, libraries) with Threats 402B.

Sexual Harassment 402D detects any form of sexual harassment towards an interlocutor, including (but not limited to):
- proposing sexual-oriented activities, e.g. "i want you to give me a blowjob",
- sharing sexual information/experiences, e.g. "i masturbate thinking of you",
- asking inappropriate sexual-oriented questions, e.g. "what is the size of your boobs?",
- sexually-oriented threats, e.g. "i will rape you until you bleed",
- making inappropriate comments, e.g. "your bulge is too big for my mouth."

Sexual/Child Exploitation 402E detects any behaviors/activities aiming at exploiting an interlocutor sexually, especially targeted against children. FIG. 12 illustrates the division of Sexual/Child Exploitation 402E into contextual sub-models. Five contextual sub-models are disclosed (there are more):
- child grooming, e.g. "there is nothing wrong with hugging an older guy like me",
- nudity extortion, e.g. "can you show me your picture of what is under your skirt?",
- persuading sexual activity, e.g. "let us meet, i will teach you how to satisfy men",
- intimate question, e.g. "have you had your period yet?",
- isolation, e.g. "why would you need your immature schoolmates when you have an adult friend like me?"

Sexual/Child Exploitation 402E contextual sub-models are therefore classified by the type of behavior/activity. It allows to design a relevant reaction for each classification, e.g. informing a child that it is completely normal to talk to the parents about everything if an attempt to isolation is detected. It is worth noting that due to the sex-related phenomena, Sexual/Child Exploitation 402E shares the system's assets (dictionaries, libraries) with Sexual Harassment 402D and Sex Trafficking 402H.

Persuading Suicide/Self-harm 402F detects coaxing, urging, persuading and encouraging of an interlocutor to commit suicide or to harm oneself, including (but not limited to):
- direct coaxing, e.g. "you should kill yourself",
- conditional coaxing, e.g. "if i were you, i would jump off the bridge",
- lowering self-esteem, e.g. "your life is worthless",
- rationalizing, e.g. "binging and purging are fine, everyone does that",
- presenting self-harm as something good, e.g. "you should try slitting your wrists, it is such a relief"

Persuading Violence 402G is analogous to Persuading Suicide/Self-harm 402F and detects coaxing, urging, persuading and encouraging an interlocutor to use violence (either verbal or physical) towards other people or animals, including (but not limited to):
- direct coaxing, e.g. "we should smash his face",
- conditional coaxing, e.g. "if i were you, i would kick his ass",
- lowering self-esteem, e.g. "i can not believe you allow him to talk this shit about you",
- rationalizing, e.g. "that is fine, he even does not deserve to live",
- presenting violence as something good, e.g. "nothing will make you feel better than beating this piece of shit."

Sex Trafficking 402H detects any forms of baiting both minors and adults to be forcefully involved in commercial sex acts through a detailed analysis of requests, threats and offers, including (but not limited to):
- suspicious job offers, e.g. "i am looking for a young, female model for an international photoshoot in egypt",
- suspicious matrimonial offers, e.g. "a 24-year-old man looking for an under-20-girl, willing to take you on a long vacation",
- cross-country dating, e.g. "i feel as if i have known you my entire life, come visit me here in dubai, i promise we will have a great time together",
- luring for a better life, e.g. "life here is so much better, we have everything that you could dream of. just come, i will help you with everything",
- international sponsorship, e.g. "let us just spend some time together, no strings attached, and i will get you something pretty in return."

Other Second Person Violence 402I stands for any new contextual sub-model that can be defined and build in order to detect another well-defined online violence phenomenon. The system does not set up any limitation in regard to this matter.

Transformations To Second Person (TTSP) 404 comprises the method for using Violence Towards Second Person Detection (VTSPD) 402 in order to online violence targeted against any other individual or group (referenced as "new violence object" in this description). In general, the method consists of:

1. Removing/hiding the second person references (e.g. pronouns—"you", "your", "yourself") in order to prevent repeat detections or not mislead VRSPD in other way. An example approach is to replace the second person references with responding form of the word "someone", e.g. "you" with "someone", "your" with "someone's."

2. Replacing references to the new violence object with responding form of second person references (e.g. pronouns—"you", "your", "yourself") in order to use exactly the same contextual models to detect online violence towards the new violence objects. This step requires to preserve and pass through the original text and the information which new violence object was transformed.

FIG. 13 is a block diagram providing detailed division of Transformations To Second Person (TTSP) 404 into a set of well-defined transformations of certain semantic/syntactic references to the new violence objects. The output of Transformations To Second Person (TTSP) 404 is the input to the next pass of Violence Towards Second Person Detection (VTSPD) 402. There is no limit of subsequent passes. Every transformation should be followed by a separate pass of Violence Towards Second Person Detection (VTSPD) 402 in order to not confuse the detection process and not lose the ability to precisely say which individual or group is the target of online violence detection.

Personal Pronouns 404A is the basic transformation replacing third person personal pronouns ("he", "she", "they", "his", "himself", and so on) with responding second person personal pronouns ("you", "your", and so on). It is very important to note that this transformation is applied after Coreference Resolution 306E from Transformation 306 in Text Preparation 112 module described in details in the previous section. The usage of Coreference Resolution 306E greatly reduces the chance of replacing unwanted pronouns as—at this point—part of the pronouns is already replaced with responding entities. The term "unwanted pronouns" refers to the situation that should not be detected as violence, e.g. expressing opinions about unspecified group of people such as "some people even do not realize they are idiots." Part of such situations are resolved by Coreference Resolution 306E, e.g. the above-mentioned sentence would be changed into "some people even do not realize some people are idiots." Additionally, the transformation has a built-in method for verifying if a given third person personal pronoun should be ignored as it refers to unspecified individual or group.

Named Entities 404B replaces named entities that can be objects of online violence with responding second person references. This transformation can be further divided into various functional groups. The first and the most obvious group consists of persons identified by names (full, first names, last names, etc.). The transformation allows to treat differently private persons and public figures such as politicians, celebrities, and so on. The user of the system (e.g. client using the API) is provided with the information against whom online violence was used and can decide what to do with this information on one's own. The other groups consist of members of named groups or named groups themselves. This covers the combination named person/ groups and membership indicator defined by common nouns, e.g. "Trump supporters" or "fans of SF Giants." This submodule has an access to the system's assets, including dictionaries and statistical classifiers. According to an embodiment, there are built-in methods for performing Named Entity Recognition (NER) combining both statistical and symbolic processing. Other embodiments allow to use external NER tools, e.g. accessed through an API.

Minority Terms 404C replaces terms related to various minorities with responding second person references. This transformation can be further divided into various functional groups, including (but not limited to): people of given sexual orientation, ethnicity, nationality, religion, supporters of given political party, people representing specific views, people practicing specific profession. In an embodiment, the minority terms are detected and replaced using dictionary-based methods. Other embodiments allow to use dedicated statistical classifiers in order to perform this task.

Other Group/Individual Terms 404D is very similar to Minority Terms 404C, but covers the replacements of different terms, mainly related to groups that are not considered as minorities in the Western world, including (but not limited to): people representing certain nations or religions (e.g. Americans, Christians). Other Group/Individual Terms 404D and Minority Terms 404C use the same methods of detection and replacement, according to an embodiment. Although, Other Group/Individual Terms 404D is further constrained by additional context-based rules in order to avoid over-reacting and not violate the freedom of speech in any way.

Other Transformation 404E stands for any new transformation that can be defined in order to include another well-defined individual or group into the standard process of online violence detection. The system does not set up any limitation in regard to this matter.

Other Violence Detection (OVD) 406 resembles the same methods for detecting online violence as Violence Towards Second Person Detection (VTSPD) 402, but functionally covers every other aspect of online violence other than violence targeted against an interlocutor, or any other individual and group, but only if the violence resembles violence targeted against second person. Therefore, it is very important to note that an overall violence detection regarding certain group of people (e.g. Jews) is usually split between two submodules:

1. Violence Towards Second Person Detection (VTSPD) 402 through the usage of Transformations To Second Person (TTSP) 404, which covers phenomena such as personal attacks or threats against certain group (e.g. Jews).

2. Other Violence Detection (OVD) 406, which covers other phenomena, such as the Holocaust denial and praising Hitler/Nazism in case of detecting violence towards Jews.

Figure 14:
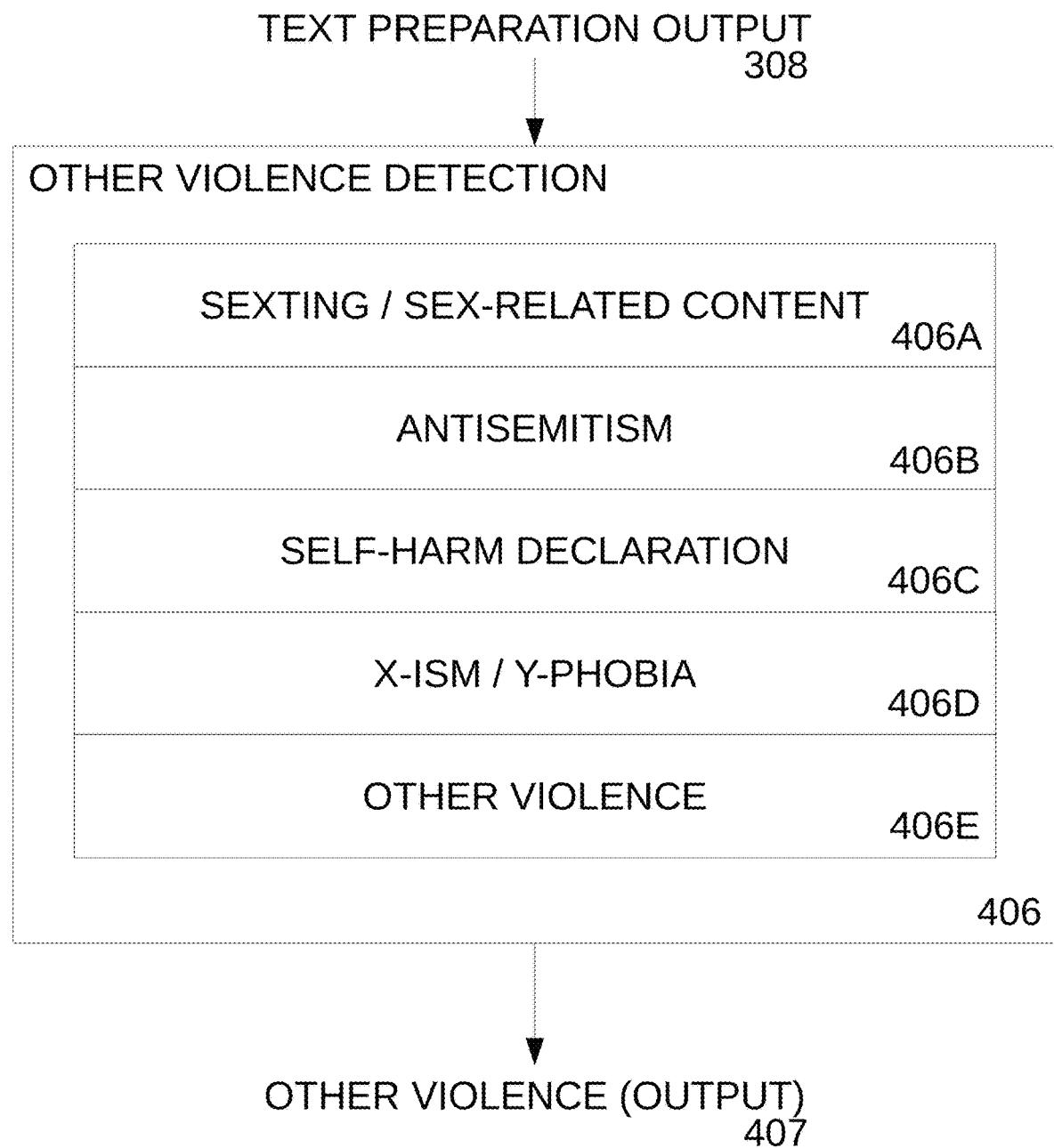
FIG. 14 is a block diagram of other violence detection (part of detection engine) according to an embodiment

FIG. 14 is a block diagram providing detailed division of Other Violence Detection (OVD) 406 into a set of contextual models related to (and detecting) certain types of online violence. Similarly to Violence Towards Second Person Detection (VTSPD) 402, Other Violence Detection (OVD) 406 utilizes a set of independent contextual models. According to an embodiment, the OVD's contextual models are built using the same methodology and having an access to the system's assets such as dictionaries and libraries, exactly as the contextual models of VTSPD.

Sexting/Sex-related Content 406A detects if a given text contains any sex-related expressions. In comparison to sex-related contextual models from Violence Towards Second Person Detection (VTSPD) 402 (Sexual Harassment 402D, Sexual/Child Exploitation 402E, Sex Trafficking 402H), Sexting/Sex-related Content 406A can be seen as the broadest sex-related model as the detection does not require the violence object, only the sex-related content. Although, VTSPD modules can still detect phenomena that are not (and should not be) detected by Sexting/Sex-related Content 406A. In this manner, all those models are complementary. The main application of Sexting/Sex-related Content 406A is to protect children from the content that they should not be presented with. According to an embodiment, this contextual model almost exclusively utilizes statistical classification. In this case, the governance of the symbolic part is boiled down to launch the statistical classifiers and to verify the symbolic exceptions that may exclude a text from detection due to some very specific conditions (e.g. detecting school materials about sex education if they are allowed).

Antisemitism 406B detects hostility to, prejudice, or discrimination against Jews. As mentioned, it focuses solely on phenomena not covered by the VTSPD's contextual models after specific transformation. Antisemitism 406B can be divided into contextual sub-models representing well-defined phenomena, including (but not limited to):

stereotypes/opinions that are not abusive if related to ordinary second person, but become abusive if related to Jews, e.g. "jews support only other jews", praising or justifying Hitler/Nazism, e.g. "hitler would be a perfect leader for our nation", antisemitic slogans and taglines, e.g. "warm up the gas chambers", abusive antisemitic terms, e.g. "kike", Holocaust denials/lies, e.g. "there is no proof that holocaust has ever happened."

Self-harm Declaration 406C detects declarations/intentions of the person who wrote the message to harm him- or herself, including committing suicide. This contextual model does not have its supplement VTSPD counterpart as it does not detect online violence targeted towards any other individual or group. According to an embodiment, it is built using the same methodology as other contextual models. The model consists of contextual sub-models related to various form of declarations/intentions, including (but not limited to):

explicit declarations, e.g. "i am going to kill myself",
implicit intentions, e.g. "my life does not make any sense to me anymore",
self-convincing/justifying, e.g. "if i die, no one would even care",
dangerous considerations, e.g. "maybe the better choice would be jumping off the bridge?"

X-ism/Y-phobia 406D detects phenomena such as sexism, racism, ageism, ableism, homophobia, and any other hostility to, prejudice, or discrimination against minorities. Similarly to Antisemitism 406B, X-ism/Y-phobia 406D covers all of such phenomena not covered by the VTSPD's contextual models after specific transformation, including (but not limited to):

stereotypes/opinions that are not abusive if related to ordinary second person, but become abusive if related to certain minority, e.g. "all muslims are terrorists",
spreading harmful conspiracy theories, e.g. "gays control the mainstream media in my country",
X-ist/Y-phobic slogans and taglines, e.g. "gay as aids",
X-ist/Y-phobic terms, e.g. "faggot",
X-ist/Y-phobic jokes, e.g. "q: why did the polack put ice in his condom? a: to keep the swelling down."

Other Violence 406E stands for any new contextual sub-model that can be defined and build in order to detect another well-defined online violence phenomenon. The system does not set up any limitation in regard to this matter.

Contextual Models

Contextual models are the foundation of the system and method. A contextual model detects a single well-defined type of online violence or a single well-defined online violence phenomenon. However, this division is completely conventional. It is assumed that type of online violence is a superordinate category detected by contextual models (e.g. Sexual/Child Exploitation 402E), whereas online violence phenomenon is a subordinate category detected by contextual sub-models (e.g. nudity extortion). Under this assumption, contextual sub-models detecting online violence phenomena are grouped together into superordinate contextual models detecting types of online violence. For reasons of convenience, in this section both contextual models and contextual sub-models are referred as contextual models because the above-mentioned division is only the result of introducing the auxiliary hierarchy.

The contextual model is an implementation of a dedicated algorithm designed to:
a) process an input text preprocessed with Text Preparation 112 module in order to
b) detect a selected well-defined online violence phenomenon.

According to an embodiment, contextual models are built using the architecture and methodology disclosed in this document.

Figure 15:
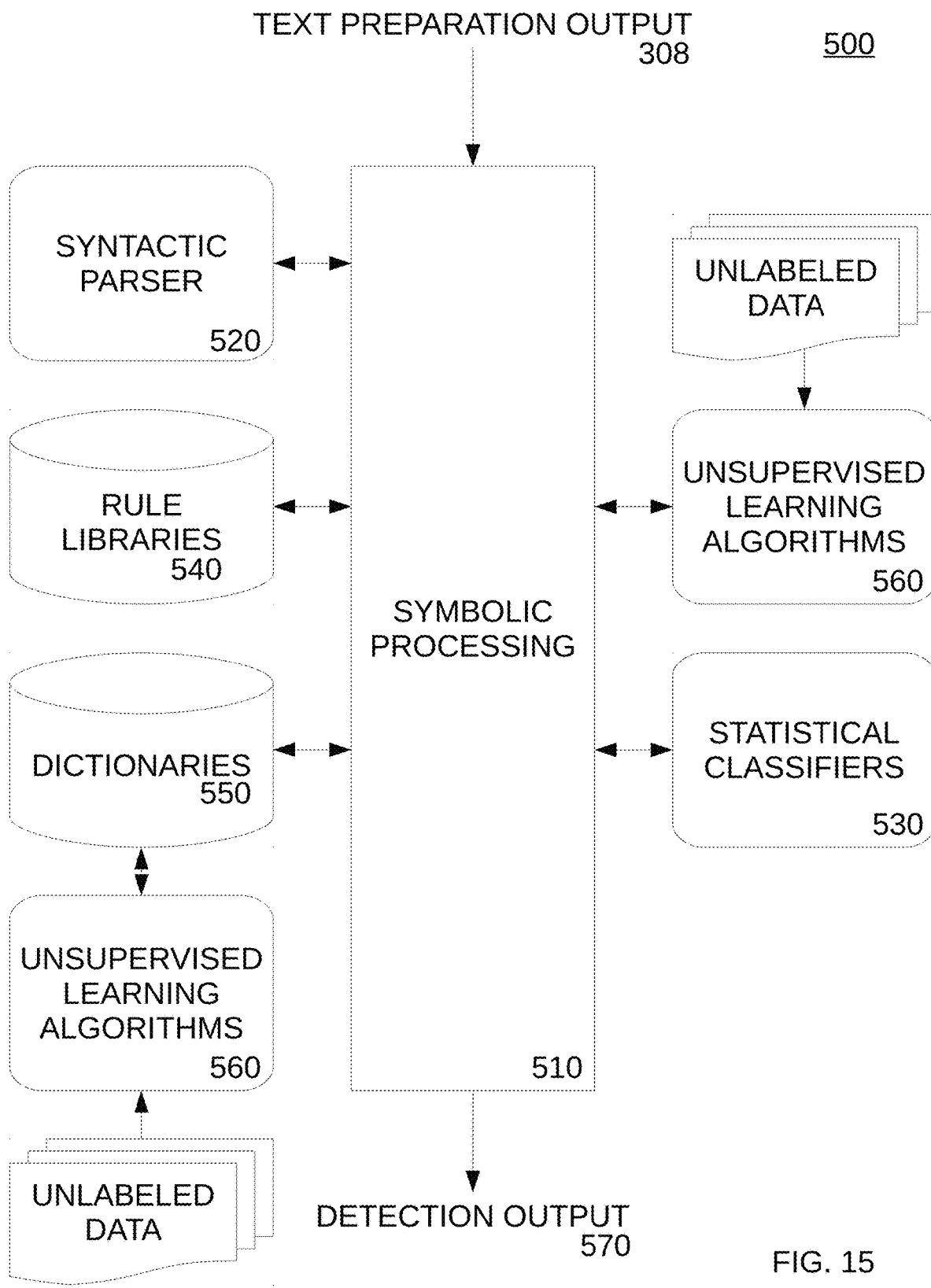
FIG. 15 is a block diagram of general architecture of online violence detection modules according to an embodiment.

FIG. 15 is a block diagram of general architecture of online violence detection modules according to an embodiment. Every contextual model utilizes the presented architecture. Each contextual model takes in a Text Preparation Output 308 as an input, and returns Detection Output 570 as an output of the processing. According to an embodiment, Text Preparation Output 308 and Detection Output 570 are the same array/object with the fields/variables (related to the result) fulfilled after the detection process. In an embodiment, the output array/object is created in the initial module and then it passed through each module, and each module adds new information (fulfills certain fields/variables) related to the process of the module. In an embodiment, the output array/object utilizes the following form (fields/variables with responding type in parenthesis):

"text_orig" (string),
"text" (string),
"segmentate" (array of strings),
"parse" (array of arrays),
"action" (array or arrays),
"result" (array of arrays).

The fields "text_orig" and "text" are fulfilled in Text Preparation 112 and they refer to the original input text and the text modified within the module, respectively. The fields "segmentate" and "parse" are related to syntactic parsing, and are fulfilled in various stages of Text Preparation 112 ("parse" can be fulfilled in Detection Engine 114). The field "action" is an additional field that stores the information regarding particular text manipulations performed in Text Preparation 112 module. Exemplary entry in "action" field: "["133*t* speak"]=>array(1) {[0]=>string(14) "idi0t=> idiot" }" refers to the correction of word "idi0t" to "idiot" using Leet Speak 304G from Correction 304 module. The field "result" remains empty in Text Preparation 112 and is fulfilled in Detection Engine 114 by the process of contextual models. Exemplary entry in "result" filed: "array(1) {[0]=>array(3) {[0]=>string(4) "high" [1]=>string(10) "#peratt001" [2]=>string(9) Vid000001"} }" refers to the processing of the sentence "You are an idi0t." According to an embodiment the above-mentioned example of field "result" contains:

"[0]=>string(4) "high" refers to the level of violence ("high", "medium", "low"),
"[1]=>string(10) "#peratt001" " refers to the internal violence category, here "#peratt001" is a token referring to direct abuses within Personal Attacks 402A,
"[2]=>string(9) Vid000001" " refers to the specific rule responsible for the detection, here "#id000001" is a token referring to the rule finding abuse assignment to second person using linking verbs.

It is important to note that according to an embodiment, each detection can be easily tracked down to the single rule responsible for the detection, using the tokens referring to particular contextual models and to particular rule within this model. Furthermore, every action performed by Text Preparation 112 module is stored and available for the analysis or development purpose. Therefore, contrary to prior art blackbox approaches based on machine/deep learning, the system and method propose a largely explainable and trackable decision-making process.

Referring to FIG. 15, the main block is Symbolic Processing 510, responsible for:
executing symbolic algorithms, methods and components, including detection rules, and
governing the whole detection process, including requesting other system's components and gathering data from them,
fulfilling the result-related fields/variables in Detection Output 570.

Symbolic Processing 510 is described in details later in this document.

Syntactic Parser 520 is responsible for providing information regarding syntactic analysis to the system. The decent set of information delivered by Syntactic Parser 520 consists of the division into words, phrases and clauses and the syntactic relations between them, including dependencies (e.g. phrase A is subject to phrase B) and inclusions (e.g. phrase A contains words X, Y and Z). According to an embodiment, Language Decoder (as described in U.S. Pat. No. 9,152,623 issued Oct. 6, 2015 and owned by Applicants)

is used as a syntactic parser providing optimal amount of information as well as high accuracy for processing user-generated content. Other embodiments allow to use different syntactic parsers, including various implementations of dependency or phrase structure grammar parsing. Although, the complement of lacking information may be required in any form (e.g. a syntactic parser's wrapper or a set of component rules). The output of Syntactic Parser 520 can be utilized directly with the use of a general purpose programming language or using a dedicated query language. The latter is recommended as it greatly eases the process of building rules using parser's output. According to an embodiment, both the component rules and the detection rules are built using a dedicated query language designed to work with Language Decoder. Other embodiments allow to use other methods for building rules. Using other syntactic parser may require to use a different query language or to adjust the one designed to work with Language Decoder to work with another parser. If a syntactic parser provides additional information such as grammatical tense (e.g. present simple), mood (e.g. imperative) or word's base forms (e.g. "hate" as a base form of "hating"), it can be a great aid for the process of building rules. According to an embodiment, Language Decoder provides such information. Other embodiments may require to build dedicated rules for establishing grammatical tense, mood or word's base form.

FIG. 17 is a diagram illustrating syntactic parser (Language Decoder) output according to an embodiment. 502A shows a visualization of simplified output of Language Decoder for the input text "Send me more nudes or I'll publish the ones I already have." One can see the division into words, phrases and clauses as well as the relations between phrases. The relation types are presented with labels for clauses and block colors for phrase. Such visualization can be useful for getting the general impressions in regard to the syntactic decomposition. 502B shows a part of a dump of the actual Language Decoder output according to an embodiment. The disclosed part provides the complete information about the first word (token) for the same input text as in 502A. One can see that aside from the information regarding divisions and relations, there is also an information regarding:

original writing ("word_orig_lex"),
base form of words ("phrase_core_base"),
grammatical tense ("clause_tense"),
grammatical mood ("clause_constructions),
Named Entity Recognition ("ner_id", "ner_type", "ner_content"),
additional semantic information about phrases ("phrase_aspect" and "phrase_category").

Statistical Classifiers 530 consist of a set of dedicates statistical classifiers utilized mainly in the detection process, but also within Text Preparation 112 (e.g. Named Entity Recognition). The statistical classifiers mostly comprise machine/deep learning models trained on labeled data in order to preform the assumed classification. However, any other approach is accepted as long as it realizes the assumed functionality. There can be more than one classifier realizing exactly the same goal. An engineer can select which one should be used in certain contextual models, or even can use all of them and set conditions for selecting the best one under given circumstances. These instructions are coded in the symbolic rules. Statistical Classifiers 530 are organized in a form of library available to Symbolic Processing 510. The symbolic rule can assign a part of the input text, send it to the selected classifier as a request, and gets back the classifier's output as a response (e.g. a category and confidence score). Therefore, Statistical Classifiers 530 do not need to be physically on the same device as the rest of the system. According to an embodiment Statistical Classifiers 530 are installed on the same device in order to minimize the communication overhead. According to other embodiment, Symbolic Processing 510 communicates with Statistical Classifiers 530 through the Internet via Application Programming Interface (API). The same rule applies to Syntactic Parser 520, and potentially all the other components disclosed on FIG. 15. It is also possible to scatter the Statistical Classifiers 530, having part of them internally on the same device, and another part on an external server. Furthermore, it is possible to use completely external services providing the statistical classifiers.

According to an embodiment, each of Statistical Classifiers 530 takes in an input text (can be only a part of the whole text from Text Preparation Output 308) and returns a set of detected categories (can be a single category for a binary classification) along with responding confidence score (from 0 to 1). Threshold for the confidence scores is set within Symbolic Processing 510. Statistical Classifiers 530 are organized in a form of library and can be described with the training- and performance-related data, e.g. what was the training dataset (size, source), what architecture/learning algorithm was used, what is the performance (average processing time, precision, recall, F1-score). This data allows an engineer to select the most suitable classifier for the given purpose. In order to give the sense of the functionality range of Statistical Classifiers 530, one can consider the following examples:

1. A text-level binary classification for detecting sexting/sex-related content: As mentioned in the description of Sexting/Sex-related Content 406A, the statistical classification plays the dominant role in this contextual model. The classifier takes in the whole input text and returns a confidence score (range from 0 to 1), describing the chances for the input text to contain any sex-related content (1 stands for very high confidence).

2. A clause-level binary classification for detecting negative consequences of a blackmail: In this case, the detection rules from Symbolic Processing 510 assign a clause or a combination of clauses (obtained from Syntactic Parser 520 output) that potentially describes the consequences of not fulfilling a request. This potential consequence is then verified whether it is negative or not.

3. A phrase-level multi-category classification for detecting abusive phrases/expressions: The detection rules from Symbolic Processing 510 assign a phrase or a combination of phrases and/or clauses (obtained from Syntactic Parser 520 output) that is assigned to an interlocutor (e.g. using linking verbs). The classifier's goal is to classify whether the phrase(s) falls into one or more of the predefined categories related to interlocutor's attribute (appearance, intelligence, knowledge, experience, and so on).

Rule Libraries 540 contain the rules utilized and executed in Symbolic Processing 510. The rules can utilize Syntactic Parser 520, but do not need to. According to an embodiment, there are two major types of the rules:

detection rules are the rules detecting the smallest subpart of the given phenomenon, such as detecting one of many ways how one person can threat another person, e.g. using a second person reference as a subject, and expressing the future using any future tense or "be going to" types of constructions; therefore, executing a detection rule can tell if the input text contains this very specific subpart of online violence or not, component rules consist of all the other rules realizing specific sub-tasks (even non-obvious) related to the detection of the given phenomenon, but not the phenomenon itself; component rules are subparts of detection rules and can be seen as building blocks; in other words, they can be used to compose the detection rule from smaller parts realizing certain well-defined tasks; some examples of component rules: detecting requests, greetings, recommendations, wishes, regrets, second person indications, intents, future expressions, and so on; other component rules can be seen as wrappers responsible for communication with Statistical Classifiers 530, including assigning specific parts of the input texts, sending them to selected classifier, and getting back the results.

Dictionaries 550 are lexical databases storing words, phrases, and other expressions used in the detection process. Functionally, they are used to supplement the rules form Rule Libraries 540, as the rules focus on grammar constructions and relations between entities, whereas Dictionaries 550 provide the vocabulary. Therefore, the detection rules are usually built from the component rules supplemented by the expressions from Dictionaries 550 and the statistical classifications from Statistical Classifiers 530. Dictionaries 550 are not limited to single words. It is possible to store the whole expressions. Although, for reasons of convenience of further development, in some cases it is better to split the expression into predicates and objects, and let the rules combine them together. Some examples of dictionaries showing the range of potential applications:

- verbs (including phrasal verbs) related to revealing an information,
- verbs and verb phrases related to harming a person physically/verbally with extended categorization, including the level of harmfulness (to hurt, to damage, to kill),
- nouns and noun phrases related to male/female genitals with extended categorization, including the abusiveness of the expression,
- sexual activities: from single words to complex expressions, stored in a minimal form and allowed to be completed and/or fulfilled with other words/expressions by the component rules, e.g. an entry "verb: suck+noun: male_genitals" can be completed with nouns/noun phrases related to male genitals and fulfilled with descriptors allowed to describe the given nouns/noun phrases. According to an embodiment, Dictionaries 550 are stored in internal databases. Although, they can be built using external sources. Other embodiments can utilize external databases such as WordNet, OpenCyc or DBpedia. According to an embodiment, dictionary entries are stored only in a base form. If required, every kind of inflection, such as conjugation or declination, is applied in Symbolic Processing 510 according to the rule requirements. Other embodiments can utilize other methods of storing entries in Dictionaries 550.

Unsupervised Learning Algorithms (ULA) 560 is a collective name for additional models used for extending dictionaries and rules without any need for labeling data. Referring to FIG. 15, there are two instances of Unsupervised Learning Algorithms (ULA) 560. The left-hand instance affects Dictionaries 550 and will be referred as Dictionary ULA. The right-hand instance affects Symbolic Processing 510 and will be referred as Rule ULA. Both Dictionary ULA and Rule ULA utilize Unlabeled Data, which refers to any normal data set or data stream without human labeling. Although, in some cases pre-trained models can be used (e.g. a pre-trained vector representation of words) and there is no need for using any additional data. In these cases, the process of learning from unlabeled data was just performed before, possibly by someone else. Each of Unsupervised Learning Algorithms (ULA) 560 can be applied in semi-supervised way in order to decrease the number of rules or dictionary entries causing the drop in precision or recall. For example, ULA generated 18 new entries to a given dictionary: 11 correct, 6 neutral (not affecting precision/recall) and 1 incorrect (causing a small drop in precision). These entries can be just added to the dictionary (unsupervised process) or can be verified by a trained person in order to exclude the incorrect entry (semi-supervised process).

Dictionary ULA extends the existing dictionaries with new entries. The already existing dictionary entries are used as primers/seeds in this process. It means that these entries comprise the starting set of words/phrases and the algorithms try to find different words/phrases that can play a similar role within similar context. The main method consists of using word embedding (vector representations of words). If needed, the approach can be supplemented with the usage of lexical databases and thesauruses (e.g. WordNet). In that case, there is a two-step process of:

a) extending the list of primers/seeds with synonyms from selected lexical database, b) extending the list of primers/seeds/their synonyms with the algorithms utilizing vector representations.

Alternative methods can be applied as long as they increase precision/recall and the consequential drop in the second parameter is tolerable. The tolerance threshold can be set in a form of exchange par, e.g. 2 new true positives for 1 new false positive can be set as a minimal tolerance threshold, and verified on testing data set. An example of alternative method of Dictionary ULA is to use predefined grammar patterns (e.g. predefined list of subjects+linking verb+arbitrary complement) utilizing the output of Syntactic Parser 520 in order to create a list of extracted complements based on the processing of unlabeled data. The list of extracted complements can be therefore used to extend the pool of abusive terms or to improve Correction 304 by finding similarly written but still misspelled entries.

Rule ULA extends mainly the detection rules, and the component rules to some extent. It resembles the same idea—to use the existing rules as primers/seeds and to generate new rules that realize the same functionality. It is important to note that the new rules have to represent the same method of expression as primers/seeds. It means that they need to be executable using the same method/engine. Instead of word embedding, a vector representation of syntactic trees delivered by Syntactic Parser 520 is used. A set of corresponding syntactic trees is generated for each of primer/seed rule. Then, the other trees are compared to the ones delivered from existing trees, using vector representation built on large corpora of unlabeled data. Once the similar trees are selected, the algorithms try to compose a new rule based on available elements, including component rules and dictionaries. Similarly to Dictionary ULA, alternative methods for generating new rules can be applied as long as they increase precision/recall and the consequential drop in the second parameter is tolerable.

Figure 16:
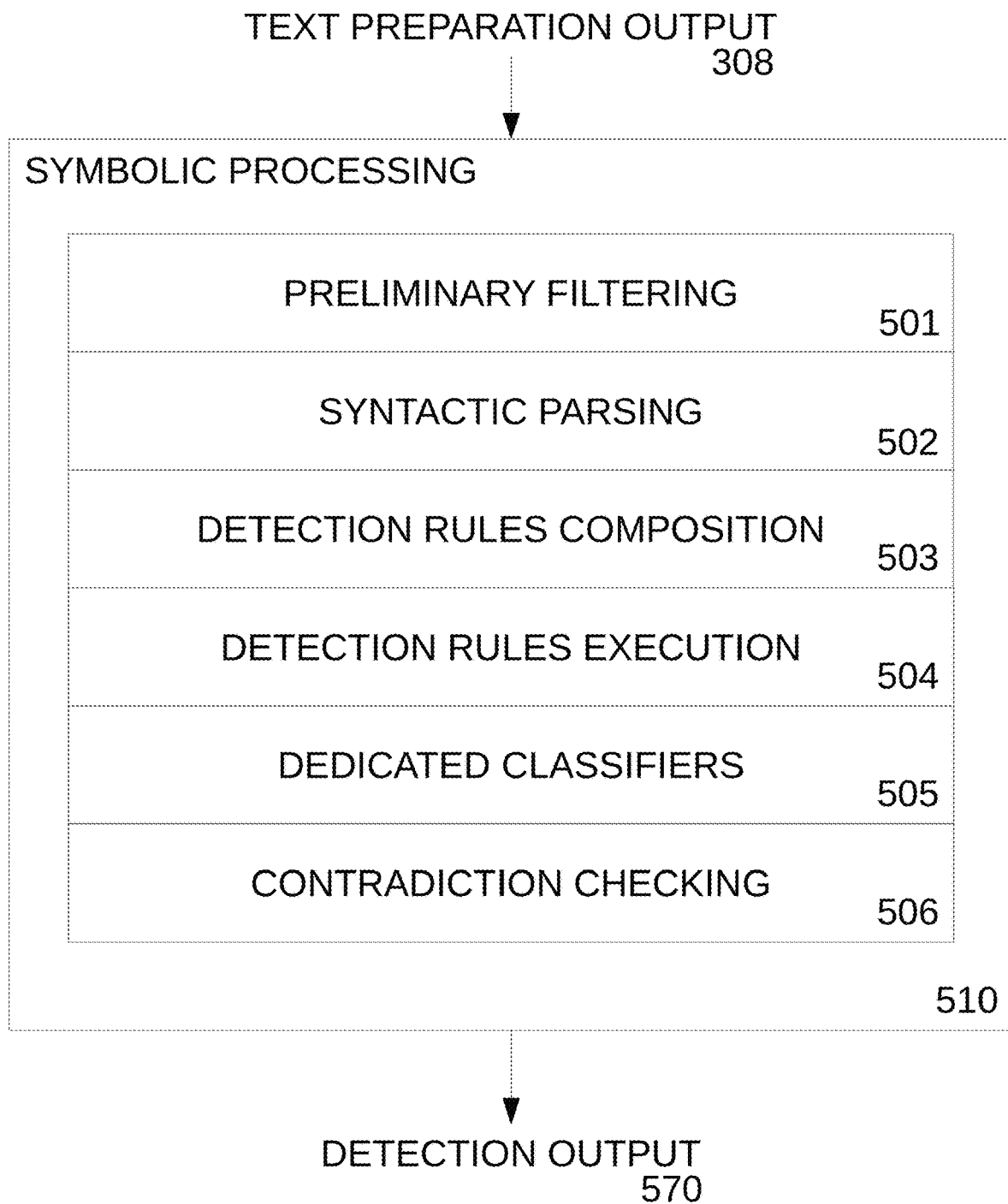
FIG. 16 is a block diagram of symbolic processing component according to an embodiment.

FIG. 16 is a block diagram providing detailed division of Symbolic Processing 510 into a set of subsequent processing steps according to an embodiment. Each of the following steps has the full access to all of the components (Syntactic Parser 520, Statistical Classifiers 530, and so on). However, certain steps are strongly related to certain components which will be emphasized in the following descriptions.

Preliminary Filtering 501 is the process of finding the input texts that have no chance of being detected by given contextual model. These texts are excluded from the detection process of given contextual model, which drastically reduce the average processing time, especially in case of rare phenomena detection. The main assumption is that there is a set of features that allows to decide with a very high confidence if a given text has any chance for being detected or not. As the input text is already corrected, in most cases Preliminary Filtering 501 relies on a verification of a list of essential keywords, or a set of keywords in proper combination and order, e.g. one of filters may require 3 words in any form in a given combination where it does not matter what is between these words. Therefore, Preliminary Filtering 501 utilizes any fast and reliable method for performing such search, e.g. regular expressions. According to an embodiment, every contextual model has a built-in function that builds up the preliminary regular expression filters automatically, based on Rule Libraries 540 and Dictionaries 550 used in the detection process. The automatically generated filters can be then modified by human engineers if needed. Some of online violence phenomena are very rare. If there is a 1% of a phenomenon in normal datasets, cutting off 95% of texts that do not have any chance for being detected is a huge profit.

Syntactic Parsing 502 is the process of using Syntactic Parser 520 in order to provide the detection rules with syntactic analysis. Only the input texts that passed through Preliminary Filtering 501 can be parsed. Furthermore, not every rule requires Syntactic Parsing 502. The input text is segmented at this point so each sentence can be parsed separately. Additionally, Preliminary Filtering 501 can filter only sentences, not the whole texts. It can be applied for the contextual models (or certain rules) that require only the sentence-based information to operate. It is also possible to filter the sentence and the whole text in order to parse the sentence and use the whole text differently, without parsing. According to an embodiment, the output of Syntactic Parsing 502 is stored in the system's output array/object. Therefore, Syntactic Parsing 502 is performed at most once for each sentence of the input text. Once the sentence is parsed in one contextual model, the information is stored in the array/object and passed through to the rest of models. Every contextual model verifies if it has all of the required information and run Syntactic Parsing 502 only if it is necessary.

Detection Rules Composition 503 is the process of combining together the component rules and the entries from the dictionaries in order to form the executable detection rules. The detection rules are build and stored in the most convenient way for their further development and maintenance. Therefore, at this point their clarity and the ability to quickly adjust or modify them is more important than the processing speed. The detection rules are coded using variables representing building blocks, e.g. request+sexual activity. Detection Rules Composition 503 is the process of collecting the required data from all of the system's components and to substitute the conceptual elements of the detection rules with their executable counterparts. It covers the process of generating the required forms of words, phrases and expressions stored in Dictionaries 550 in their base form. This process utilizes the built-in dedicated algorithms. For purpose of optimization, the executable detection rules are stored in Rule Libraries 540. If any element of the detection rule is changed, the new executable rule is generated. In contrast to development version of the system, the production version of the system requires only the executable detection rules.

Detection Rules Execution 504 is the process of executing the executable detection rules, delivered by Detection Rules Composition 503 or stored in Rule Libraries 540 if they were already processed.

This step largely overlaps with the two following steps: Dedicated Classifiers 505 and Contradiction Checking 506. Functionally, Detection Rules Execution 504 verifies if the input text matches the executable detection rule. In that case, Detection Rules Execution 504 performs two additional steps:

1. Dedicated Classifiers 505: If the detection rule requires the usage of Statistical Classifiers 530, the selected part of the input texts is assigned as the classifier's input by Detection Rules Execution 504 using the guidelines from the detection rule. Detection Rules Execution 504 sends the request, gets the response and takes it into consideration executing the detection rules. At this point, Detection Rules Execution 504 has the complete set of information required to detect online violence.

2. Contradiction Checking 506: If the input text is detected as containing online violence, the final step is performed. Detection Rules Execution 504 assigns the selected part of the input texts as the input of Contradiction Checking 506. Usually, the input of Contradiction Checking 506 consists of the detected sentence and a couple of surrounding sentences. Although, sometimes the whole input text is used. Contradiction Checking 506 utilizes a special set of rules that verifies the broader context in order to find the indicators that the already detected text should not be treated as online violence. These indicators can be any form of:

negation-related expression, "i don't think you are an idiot", counter-factual expressions, e.g. "at first, i thought you are an idiot, but i was totally wrong", quotation or indirect speech, e.g. "i can not believe he said you are an idiot", other expressions that do not fall into the above-mentioned categories.

Functionally, the rules of Contradiction Checking 506 can be built and stored exactly as the detection rules. They use the same system's assets: the component rules from Rule Libraries 540 and the entries from Dictionaries 550. Therefore, they can be substituted by their executable counterparts in Detection Rules Composition 503 and stored in Rule Libraries 540. According to an embodiment, they are separated from the detection rules due to the fact that the contradiction rules are independent from the detection rules and the same set of contradiction rules can be applied to different contextual models. Therefore, the detection rules and the contradiction rules can be developed independently by different teams of engineers.

Figure 18:
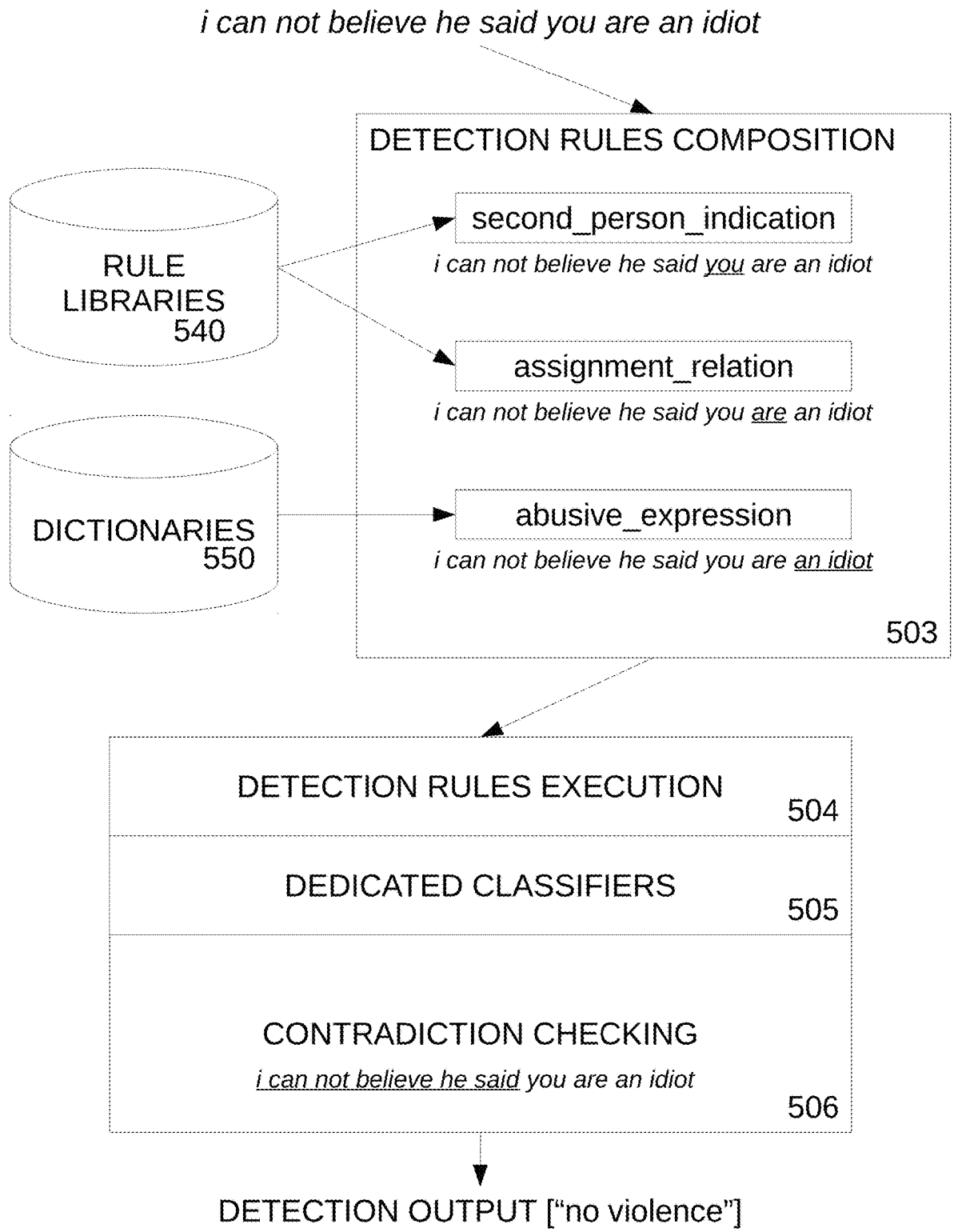
FIGS. 18-19 are diagrams illustrating the operation of online violence detection modules according to an embodiment.
Figure 19:
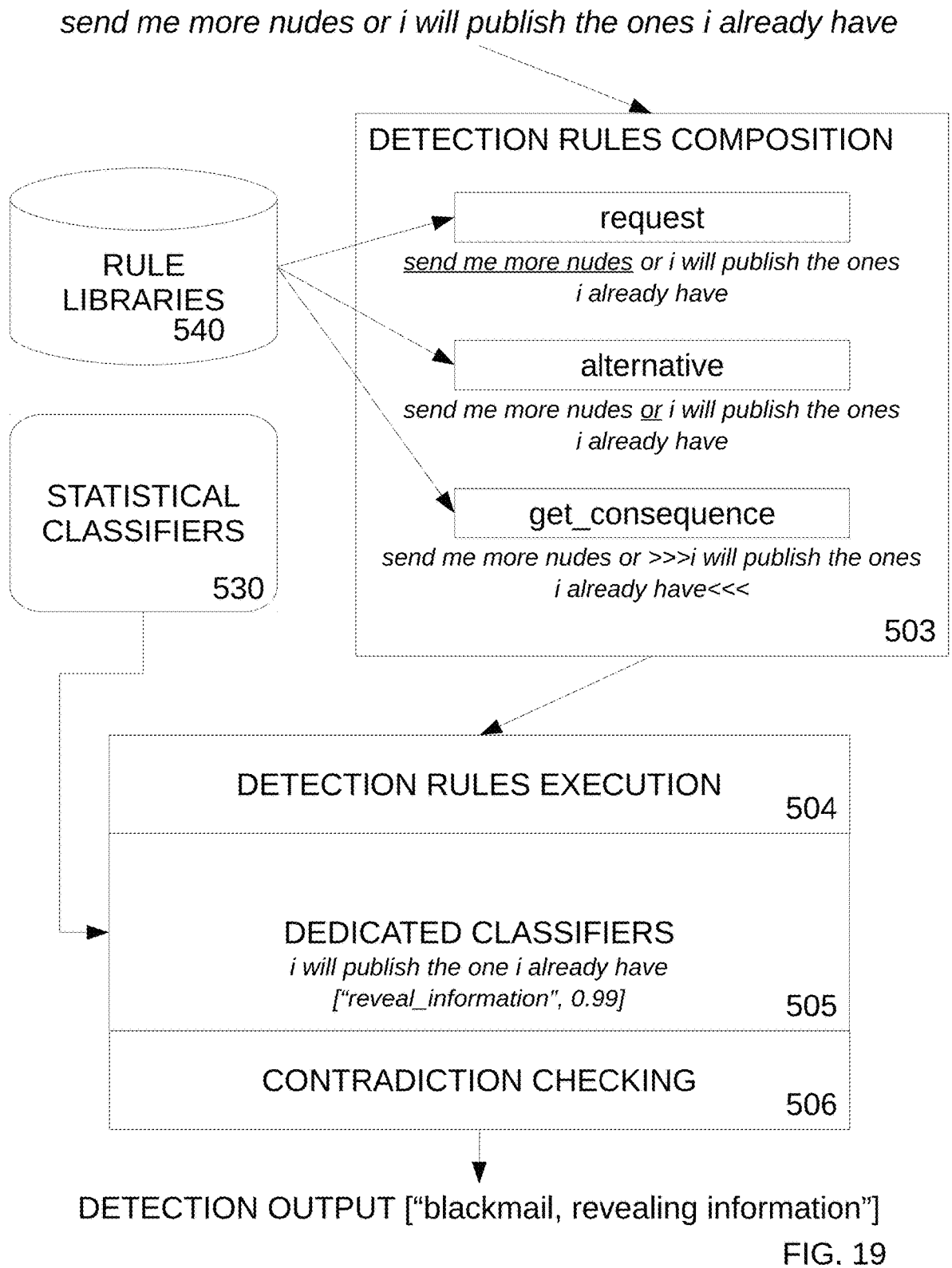

FIGS. 18-19 are diagrams illustrating a process of Symbolic Processing 510 according to an embodiment. The two first steps—Preliminary Filtering 501 and Syntactic Parsing 502—are skipped since they are not required to explain the process. One should assume that the input texts from both diagrams passed through Preliminary Filtering 501 and were successfully parsed using Syntactic Parsing 502. Referring to FIG. 18, the input to Symbolic Processing 510 representing a contextual model of Personal Attacks 402A is the text "i can not believe he said you are an idiot." Detection Rules Composition 503 is presented as a process of combining three elements in order to detect a personal attack (detected elements are underlined):

second_person indication from Rule Libraries 540 is a component rule that allows to find second person references in text; functionally, it detects if a given phrase contains a second person reference; in the example "i can not believe he said you are an idiot", a reference is detected as subject "you", assignment_relation from Rule Libraries 540 is another component rule that detects if there is an assignment relation between two other elements; assignment relation is a relation that assigns a feature or a set of features expressed within one element to the entity expressed in the second element; the most frequent case of assignment relation is using a linking verb that assigns the features from complement to the entity from subject; in the example "i can not believe he said you are an idiot", an assignment relation is detected as predicate "are", abusive_expression from Dictionaries 550 is a set of expressions (words, phrases) that are considered to be offensive/abusive while used against other person; the expressions can be categorized with type of abuse or level of harmfulness; Detection Rules Composition 503 takes the full set from Dictionaries 550 and generates all required forms of the expressions using the dedicated built-in functions; the enriched set of expressions is then used to verify if a given phrase contains an abusive expression; in the example "i can not believe he said you are an idiot", an abusive expression is detected as complement "an idiot."

The executable rule composed in Detection Rules Composition 503 step is then executed in Detection Rules Execution 504 step. The personal attack is detected. Dedicated Classifiers 505 step is skipped since this particular contextual model does not require this step to operate. As a final step, Contradiction Checking 506 is performed. According to the example, a contradiction was detected (underlined) in a form of indirect speech and therefore the input text is eventually not classified as online violence, although it was detected with the executable rule. Symbolic Processing 510 returns "no violence" as a result of detection process.

Referring to FIG. 19, the input to Symbolic Processing 510 representing a contextual model of Blackmails 402C is the text "send me more nudes or i will publish the ones i already have." Detection Rules Composition 503 is presented as a process of combining three elements in order to detect a personal attack (detected elements are underlined):

request from Rule Libraries 540 is a component rule that allows to find any grammar construction that can be used to express request; it can be simply an imperative or any of the following constructions: "you should/have to/had better . . . ", "why do not you . . . ", "if you do not . . . ", and so on; the above list serves the illustrative purpose, it is neither exhaustive nor complete; in the example "send me more nudes or i will publish the ones i already have", a request is detected as predicate (imperative) "send me more nudes", alternative from Rule Libraries 540 is another component rule that verifies if two other elements are connected with each other using a relation of alternative of not fulfilling a condition; therefore, one of the two connected elements comprises a condition (request), whereas the second comprises an implication (consequence); the alternative does not need to by explicitly present in text (e.g. "i will kill you if you do not give me money") to be detected with this component rule; in the example "send me more nudes or i will publish the ones i already have", an alternative is detected as connector "or", get consequence from Rule Libraries 540 is an example of component rule that assigns part of an input text in order to perform statistical classification using Dedicated Classifiers 505; this particular rule assigns the implication (consequence) part of the alternative for the further processing (marked with angle brackets in FIG. 19); in the example "send me more nudes or i will publish the ones i already have", a consequence is assigned as "i will publish the ones i already have."

During Detection Rules Execution 504 step, Dedicated Classifiers 505 sends the assigned part of text to Statistical Classifiers 530, and gets back the response; here, the assigned text is classified as "reveal_information" with the confidence score of 0.99. Therefore, the blackmail is detected. Since Contradiction Checking 506 does not find any contradictions, Symbolic Processing 510 returns "blackmail, revealing information" as a result of detection process.

Customization

Due to the strict symbolic governance over the decision-making process and the clear modular architecture, the system and method demonstrates high customization capabilities. According to an embodiment, each detection rule, even if utilizes Statistical Classifiers 530, can be identified by its unique ID number. Similarly, as mentioned in the Contextual Models section, every modification introduced by Text Preparation 112 module is also stored and passed through the whole online violence detection process. Therefore, an engineer developing the system can immediately determine why the system made certain decision. This feature greatly reduces time and effort required for development and maintenance of the system.

According to an embodiment, a system developer is provided with a development environment that allows to collect, visualize and analyze statistics of processed data in regard to data sources and detection rule IDs along with modifications introduced by Text Preparation 112 module.

Furthermore, the development environment is equipped with the tools to label data and the ability to use labeled datasets in order to control the system's accuracy, but also to see which rules are responsible for correct and incorrect detections. This ability comprises a great aid in planning the future development directions and adjusting the system to particular data sources. Additionally, the development environment is integrated with Syntactic Parser 520 which helps to track if an error is related to wrong parsing or not. In an embodiment, a system developer adjusts the system to given data source manually or semi-automatically using the data stored in the development environment. In other embodiments, the process of adjusting the system is fully automatized utilizing labeled datasets and supervised machine learning methods.

The process of adjusting the system to particular data sources or guidelines is called "onboarding process." The information related to data sources and guidelines can be obtained automatically as mentioned above, or manually by referring to client's guidelines (if available) or interviewing/surveying client's employees. The goal of the interviews/surveys is to determine which online violence phenomena are allowed and which should be blocked within given service/community. The interviews/surveys can be performed by human (e.g. a system developer) or using pre-defined forms/applications (e.g. filling up a web-based online survey). The decisions regarding online violence phenomena are applied by switching on and off the detection rules related to these phenomena. This process can be performed manually, semi-automatically or automatically. The most common types of settings regarding the onboarding process can be predefined and delivered through specific API requests. According to an embodiment, a control over what an API returns in terms of the whole hierarchical output structure is provided within the API, using the API request features. Other embodiments require the deployment of a dedicated API after adjusting the system to certain data sources or guidelines. Additionally, Unsupervised Learning Algorithms (ULA) 560 described in the Contextual Models section can be used as a part of onboarding process in terms of adjusting the system to certain data sources.

The various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof.

Examples of transfers of such formatted data and/or instructions by carrier waves include, but are not limited to, transfers (uploads, downloads, e-mail, etc.) over the internet and/or other computer networks via one or more data transfer protocols (e.g., HTTP, FTP, SMTP, etc.). When received within a computer system via one or more computer-readable media, such data and/or instruction-based expressions of components and/or processes under the system described may be processed by a processing entity (e.g., one or more processors) within the computer system in conjunction with execution of one or more other computer programs.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the system include: microcontrollers with memory (such as electronically erasable programmable read only memory (EEPROM)), embedded microprocessors, firmware, software, etc. Furthermore, aspects of the system may be embodied in microprocessors having software-based circuit emulation, discrete logic (sequential and combinatorial), custom devices, fuzzy (neural) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise forms disclosed. While specific embodiments of, and examples for, the systems components and methods are described herein for illustrative purposes, various equivalent modifications are possible within the scope of the systems, components and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

What is claimed is:

1. A method for detecting one or more predetermined online behaviors, the method comprising:

an online violence detection system comprising at least one processor receiving online data from any sources on the internet and processing the online data to determine whether the online data contains online violence, wherein processing the data comprises, the at least one processor receiving plain text input;

the at least one processor performing a plurality of functional modules, the plurality of functional modules comprising one or more of a text preparation module, a normalization module, and a correction and transformation module, wherein, normalization comprises the process of transforming the plain text input into a single predetermined canonical form to generate normalized text;

correction comprises the process of revising the normalized text in order to correct misspellings and any other types of intentional and non-intentional errors to generate corrected text; and transformation comprises the process of revising the corrected text in order to replace, remove or add specific text fragments to generate transformed text that is optimally phrased for detecting one or more predetermined online behaviors; and the at least one processor performing online violence detection on the normalized text, the corrected text, and transformed text, including, at least one module detecting online violence, wherein the at least one module is comprised of a set of contextual models wherein, each contextual model comprises a detection model for detecting a single well-defined type of online violence; and each contextual model classifies text as containing or not containing a given type of online violence and assigns a set of processing-related information to the text.

2. The method of claim 1, wherein the processing-related information comprises:
  categories and sub-categories of detected violence;
  information allowing identification of a rule responsible for the detection; and
  text preparation data.

3. The method of claim 1, wherein each contextual model comprises one or more of symbolic processing, syntactic parsing, statistical classifiers and unsupervised learning techniques in detecting the one or more predetermined online behaviors.

4. The method of claim 3, wherein symbolic processing of each contextual model:
  executes symbolic algorithms, methods, and components, including detection rules, in detecting the one or more predetermined online behaviors; and
  governs usage of rules, dictionaries, outputs of a syntactic parser and the statistical classifiers, including requesting supportive system components and gathering data from the supportive system components.

5. The method of claim 3, wherein symbolic processing of each contextual model comprises:
  preliminary filtering;
  composition and execution of detection rules;
  syntactic parsing;
  dedicated classifiers; and
  contradiction checking.

6. The method of claim 3, wherein symbolic processing of each contextual model comprises using one or more rules stored in one or more rule libraries, wherein:
  each rule performs a binary classification in order to verify if a text input character string contains a sought language or online violence phenomenon; and
  each rule has access to, and can make use of a syntactic parser, dictionaries and statistical classifiers.

7. The method of claim 6, wherein each rule represents one of four functional categories comprising:
  detection rules identifying a separated and well-defined subpart of a given online violence phenomenon, defined as a single manner in which a person can use natural language to express the given phenomenon;
  component rules related to a specific sub-task for detection of the given online violence phenomenon but not identifying the given online violence phenomenon itself and comprises a building block from which the detection rules can be composed;
  contradiction checking rules analyzing a broad context of the input text and identifies the linguistic premises indicating that the text should not be detected as online violence regardless of the detection rules;
  wrapper rules responsible for communication with statistical classifiers, including assigning specific parts of an input text character string, sending them to selected classifier, and getting back the results.

8. The method of claim 3, wherein each statistical classifier complements the contextual models with text classification that verifies whether an input character string belongs to one or more predefined categories by taking in the string and returning a set of detected categories along with a corresponding confidence score.

9. The method of claim 3, wherein unsupervised learning techniques utilize unlabeled data or machine-labeled data to improve the contextual models by increasing the number of true positive results detected by the models or decreasing the number of false positive results detected by the models.

10. The method of claim 1, wherein normalization further comprises:
  converting text to a default character encoding;
  performing segmentation and entity recognition; and
  recognizing at least one of contractions, emoticons, redundant repetitions, whitespaces, tags, markers, and code snippets.

11. The method of claim 1, wherein correction further comprises:
  correcting typos, misspellings, word boundaries, and character replacements;
  converting enumerations and listings; and
  resolving syntactic errors based on verifying part-of-speech agreements.

12. The method of claim 11, wherein correction comprises one or more approaches, the approaches comprising:
  a dictionary-based approach comprising using a plurality of algorithms for evaluating similarity metrics between misspelled words and correct dictionary entries; and
  a context-based approach comprising using the plurality of algorithms for one or more of finding a replacement and preparing a list of candidates for replacements for other modules and methods, based on establishing what element is required or expected within a given context.

13. The method of claim 1, wherein transformation further comprises execution of the transformation module comprising:
  replacing certain expressions and entities with their equivalents recognizable by the system for detecting one or more predetermined online behaviors;
  removing irrelevant expressions and entities;
  fulfilling omitted expressions and entities; and
  recognizing quotations and indirect speech.

14. The method of claim 1, wherein the at least one processor is further configured as a detection engine in order to perform online violence detection, including at least one functional module for detecting online violence targeted against a second person, wherein the second person is characterizable as an interlocutor.

15. The method of claim 14, wherein detecting online violence targeted against the second person comprises the use of contextual models for detecting a plurality of types of online violence comprising: personal attacks; threats; blackmail; sexual harassment; persuading harmful behaviors; and sexual and child exploitation.

16. The method of claim 14, wherein the detection engine further comprises at least one module performing transformations to second person that transforms normalized, corrected, and transformed text so as to enable detecting online violence targeted against the second person to further detect online violence targeted against any other individual or group.

17. The method of claim 16, wherein performing transformations to second person comprises a plurality of text transformations, comprising replacing third person personal pronouns, named entities that can be objects of online violence, and terms related to minorities and other groups of people, with responding second person references.

18. The method of claim 14, wherein the detection engine further comprises at least one module for detecting other online violence that cannot be detected with the at least one functional module for detecting online violence targeted against a second person, wherein detecting comprises one or more of performing transformations to second person, and not performing transformations to second person.

19. The method of claim 14, wherein detecting other online violence comprises using contextual models to detect the plurality of types of online violence comprising: sexting and sex-related content; self-harm declaration; sexism; racism; ageism; ableism; homophobia; and any other hostility to, prejudice against, or discrimination against minorities and any other individuals and groups.

20. A natural language processing method comprising:
at least one processor receiving online data from any sources on the internet and processing the online data to determine whether the online data implicates online violence, wherein processing the data comprises,
the at least one processor receiving plain text input;
the at least one processor performing a plurality of functional modules, the plurality of functional modules comprising one or more of a text preparation module, a normalization module, and a correction and transformation module that generate the normalized text, the corrected text, and transformed text, respectively, wherein normalization comprises the process of transforming the plain text input into a single predetermined canonical form to generate normalized text, correction comprises the process of revising the normalized text in order to correct misspellings and any other types of intentional and non-intentional errors to generate corrected text, and transformation comprises the process of revising the corrected text in order to replace, remove or add specific text fragments to generate transformed text that is optimally phrased for detecting one or more predetermined online behaviors; and
the at least one processor performing online violence detection on the normalized text, the corrected text, and transformed text, including,
at least one module detecting online violence, wherein the at least one module is comprised of a set of contextual models wherein,
each contextual model comprises a detection model for detecting a defined single type of online violence;
each contextual model classifies text as containing or not containing a given type of online violence and assigns a set of processing-related information to the text; and
the at least one contextual model is customizable by a user to alter one or more of the definitions of the single type of online violence and how the text is classified.

21. The method of claim 20, wherein a contextual model is customized by turning off and on one or more detection rules in order to define which subparts of a given online violence phenomenon should be detected by the contextual model.

22. The method of claim 21, wherein information regarding which detection rules should be turned off and on within a community can be obtained by utilizing annotated datasets from the community and supervised machine learning methods, by analyzing community guidelines, or by interviewing people responsible for the community.

23. The method of claim 22, wherein a process of obtaining and applying information regarding which detection rules should be turned off and on can be performed manually, semi-automatically or automatically.

24. The method of claim 20, wherein a contextual model is customized by altering dictionaries, wherein altering dictionaries comprises changing which words, phrases and expressions should be designated as offensive.

25. The method of claim 24, wherein the offensive words, phrases and expressions are assigned a severity level.

26. The method of claim 24, wherein the dictionaries are changed manually, semi-automatically or automatically, utilizing supervised and unsupervised machine learning methods.

27. The method of claim 20, wherein a contextual model is customized by utilizing a Transformations To Second Person module, wherein a set of words, phrases and expressions referring to a selected individual or group is transformed into second person references in order to make the individual or group being treated by the system as a potential violence object.

28. The method of claim 27, wherein the Transformations To Second Person module can be utilized to exclude a selected individual or group from being treated by the system as a potential violence object.

29. The method of claim 20, wherein a contextual model is customized by altering combinations the dictionary entries and detection rules in order to specify how the selected dictionary entries should be treated by the system in different contexts represented by the detection rules.

30. The method of claim 20, wherein a contextual model is customized by re-assigning detection rules in order to create a new hierarchical structure of violence categories.

* * * * *